United States Patent [19]

Wang

[11] Patent Number: 4,842,292

[45] Date of Patent: Jun. 27, 1989

[54] FOLDABLE MULTIPURPOSE BICYCLE

[76] Inventor: Fu-Chao Wang, 3rd F., No. 31, Chao Chou St., Taipei, Taiwan

[21] Appl. No.: 134,510

[22] Filed: Dec. 16, 1987

[51] Int. Cl.$^4$ .............................................. B62K 15/00
[52] U.S. Cl. .................................. 280/287; 280/278; 280/30; 280/288.4; 440/27
[58] Field of Search .................. 280/287, 278, 30, 7.1, 280/7.12, 7.14; 440/11, 12, 26, 27, 30, 31; 74/551.1, 551.3, 551.4, 594.1, 594.7; 188/24.11, 29

[56] References Cited

U.S. PATENT DOCUMENTS

| | | | |
|---|---|---|---|
| 3,640,239 | 2/1972 | Potroskey | 440/12 |
| 3,979,113 | 9/1976 | Uhl et al. | 280/289 R |
| 4,170,188 | 10/1979 | Jamison, Jr. | 440/30 |
| 4,440,414 | 4/1984 | Wang | 280/278 |

Primary Examiner—Charles A. Marmor
Assistant Examiner—Donn McGiehan
Attorney, Agent, or Firm—Ladas & Parry

[57] ABSTRACT

A foldable multipurpose bicycle includes a foldable main frame, a foldable handlebar assembly, a removable seat assembly, a pair of foldable pedal assemblies, a front brake assembly, and a foldable rear brake assembly. By using a pair of quick-release lock mechanisms, a pair of wheels can be connected quickly to the main frame to form a bicycle for riding on land. Alternatively, a front wheel and a tripod can be connected to the main frame to form an exercise bicycle. Or, a float assembly and a propeller assembly can be connected to the main frame to form an hydro-bicycle for riding on smooth surfaced water. The float assembly and the propeller assembly can be mounted removably on the rear portion of the main frame. The bicycle can be folded into a relatively small wheel-like unit which is capable of being conveniently pushed on the ground.

23 Claims, 26 Drawing Sheets

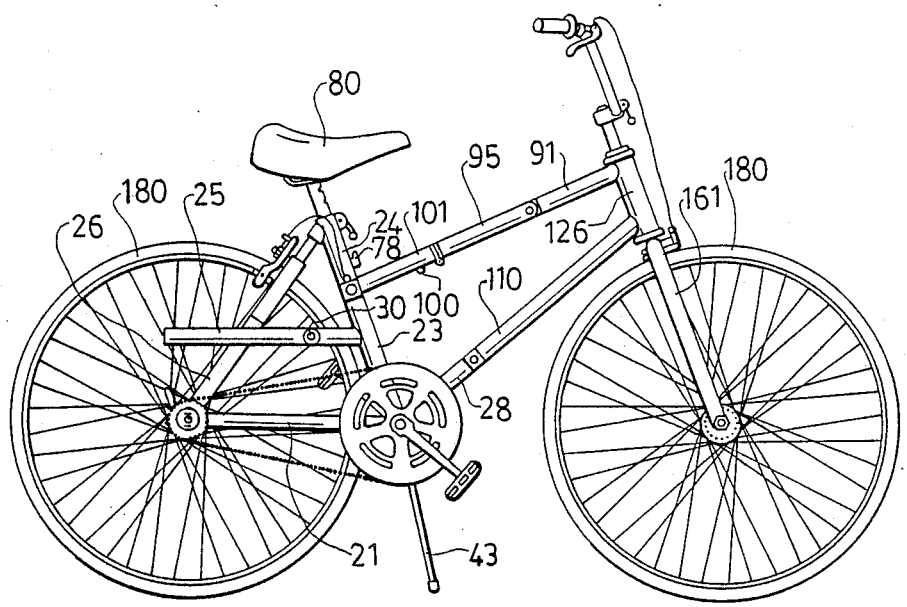
F I G. 2
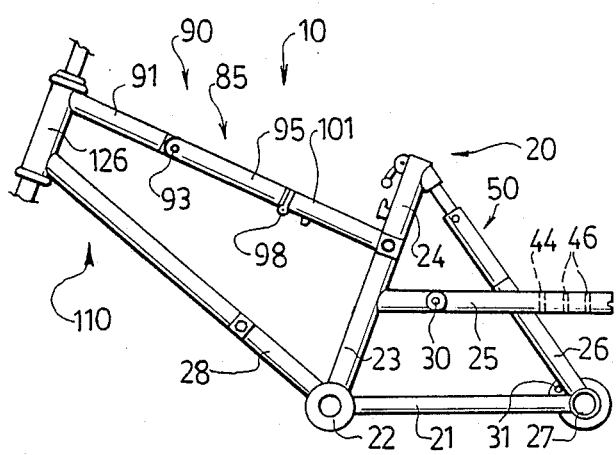
F I G. 3

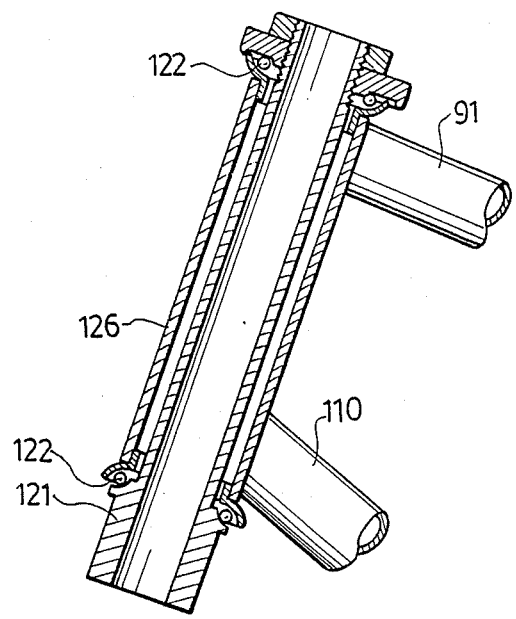
F I G. 4
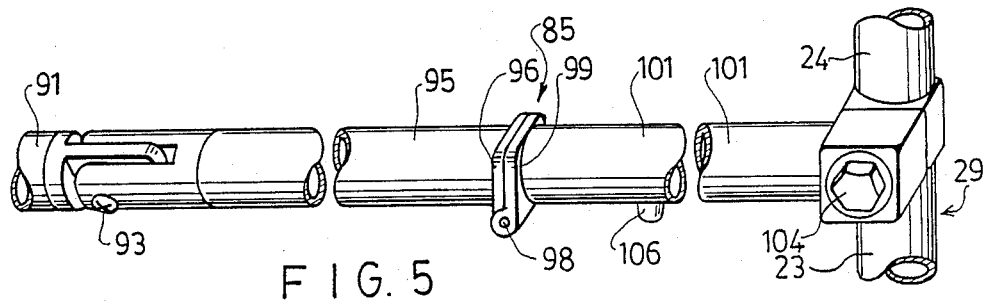
F I G. 5
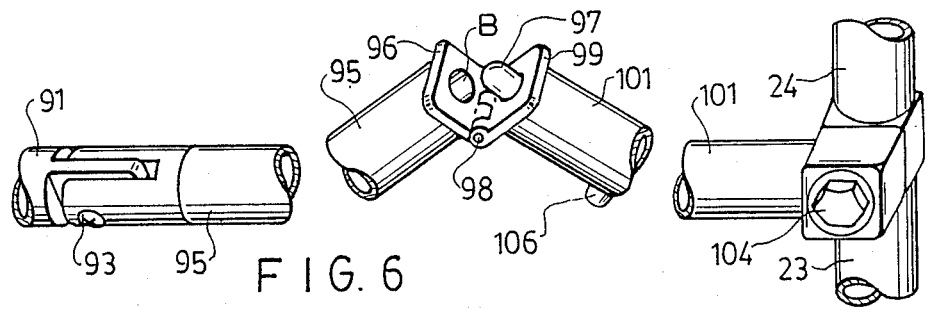
F I G. 6

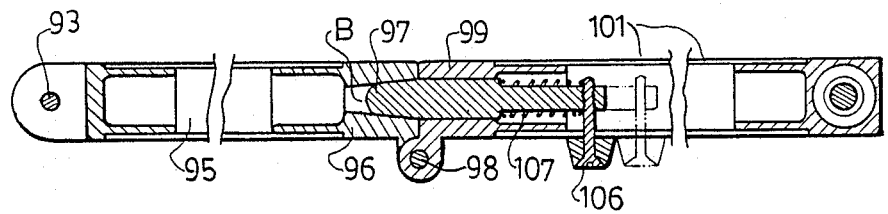
F I G. 7
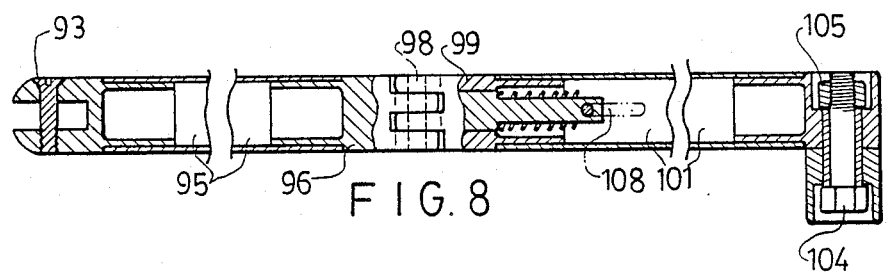
F I G. 8
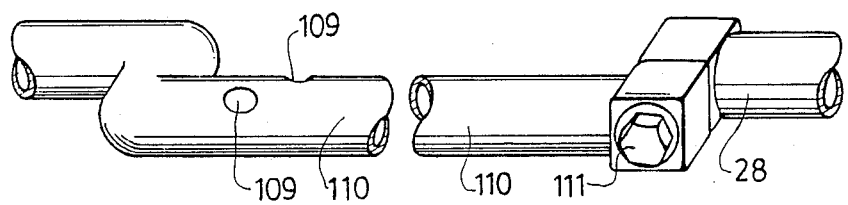
F I G. 9

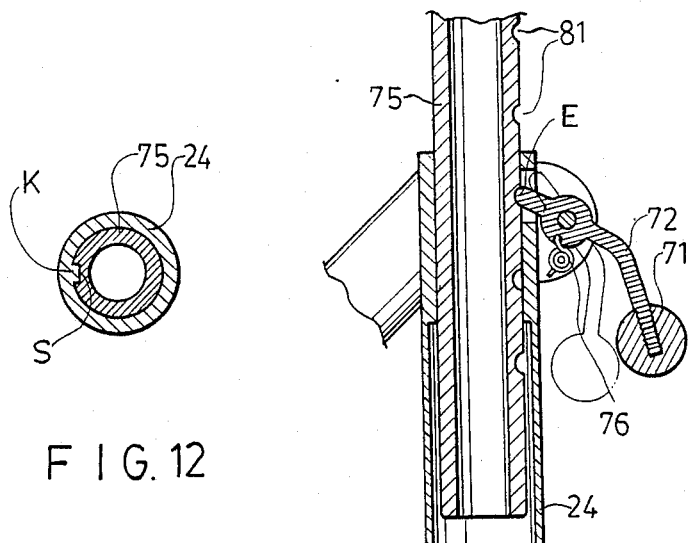
FIG. 12
FIG. 13
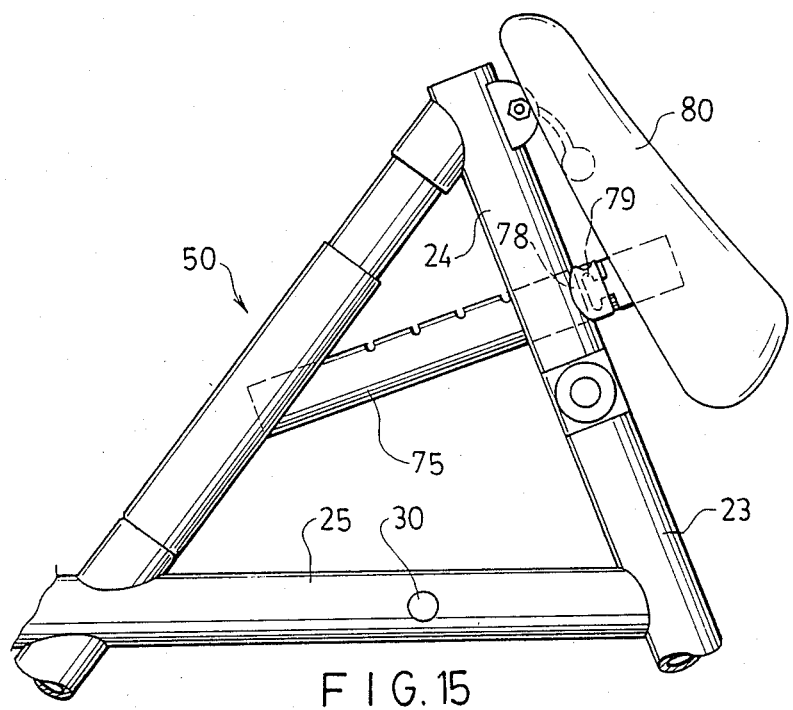
FIG. 15

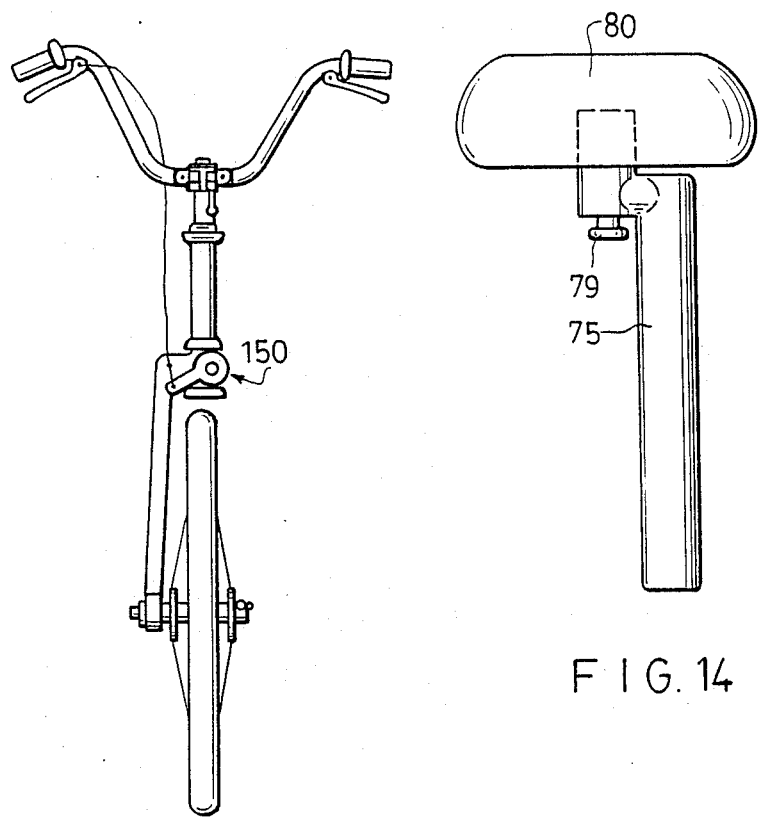
FIG. 16
FIG. 14
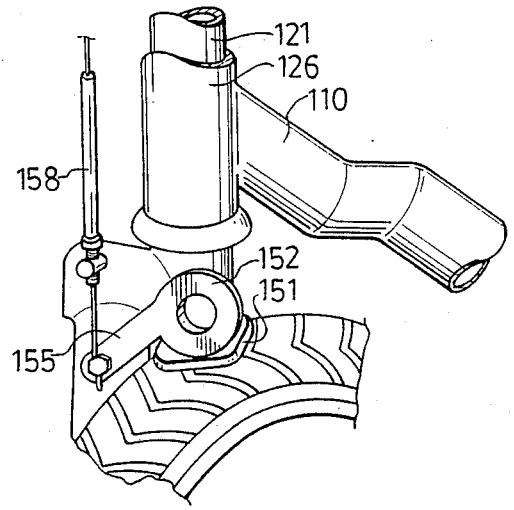
FIG. 17

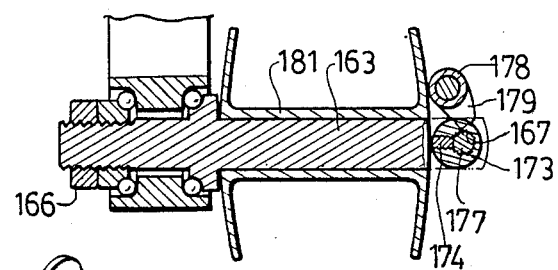
FIG. 42
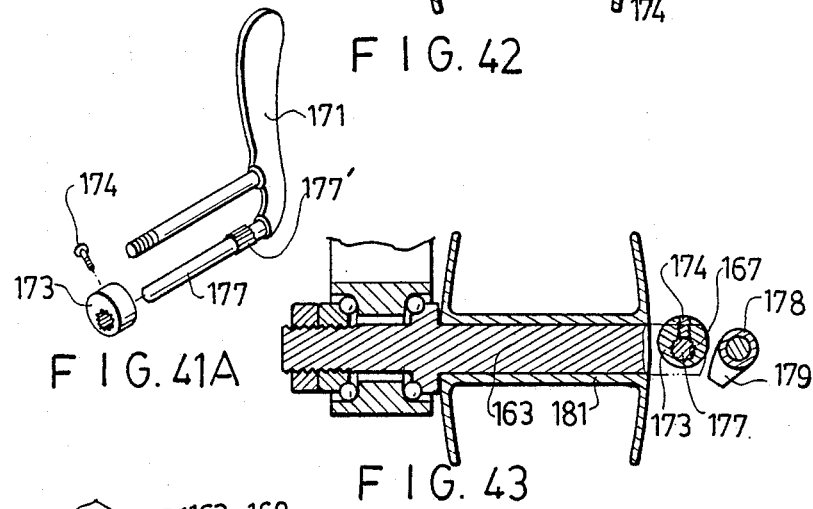
FIG. 41A
FIG. 43
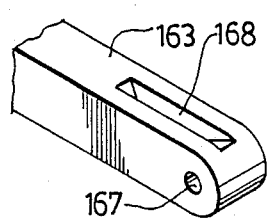
FIG. 40
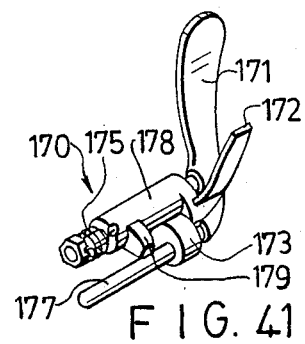
FIG. 41
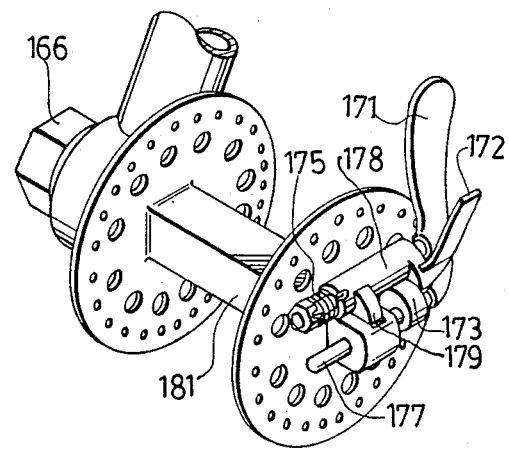
FIG. 39

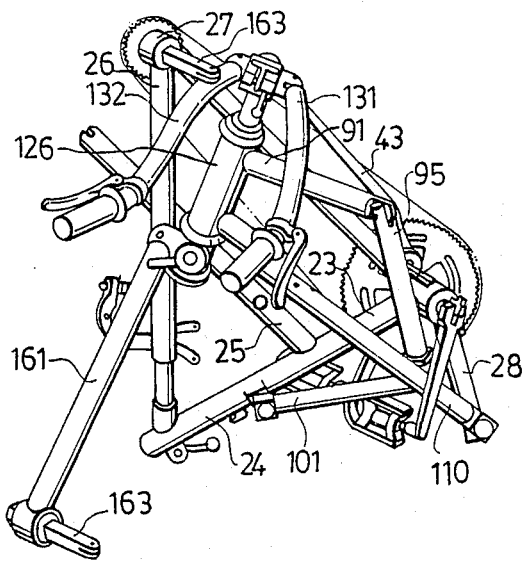
FIG. 46
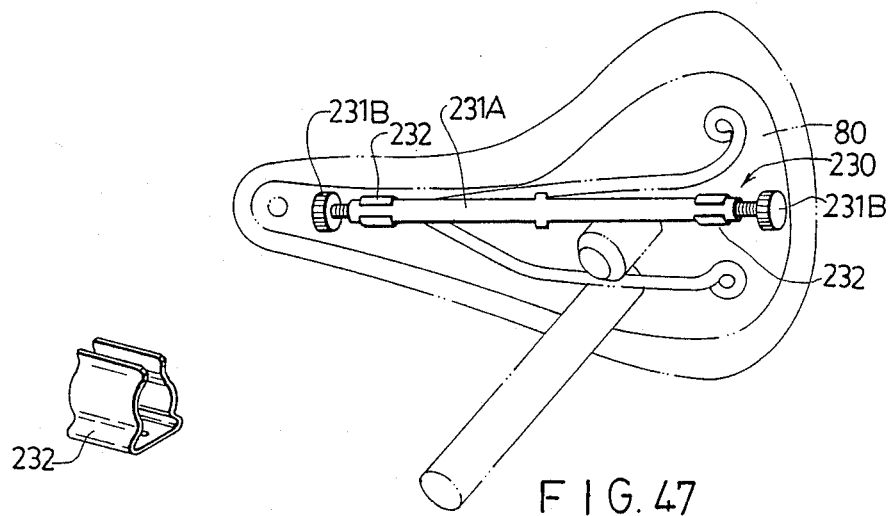
FIG. 48
FIG. 47

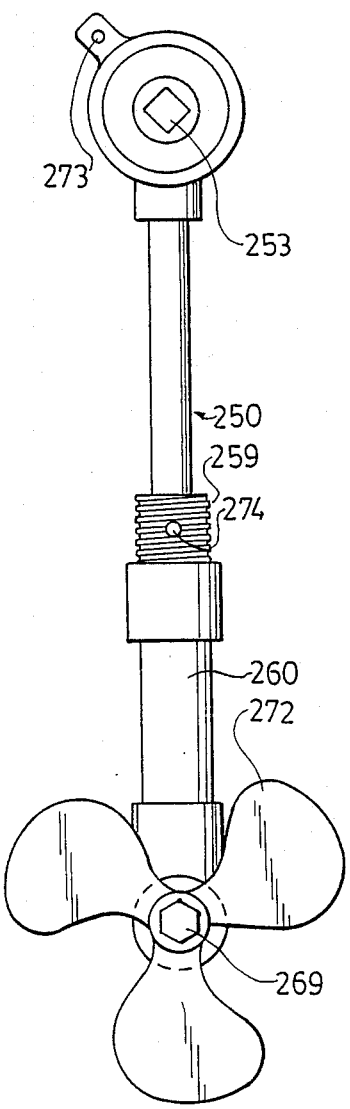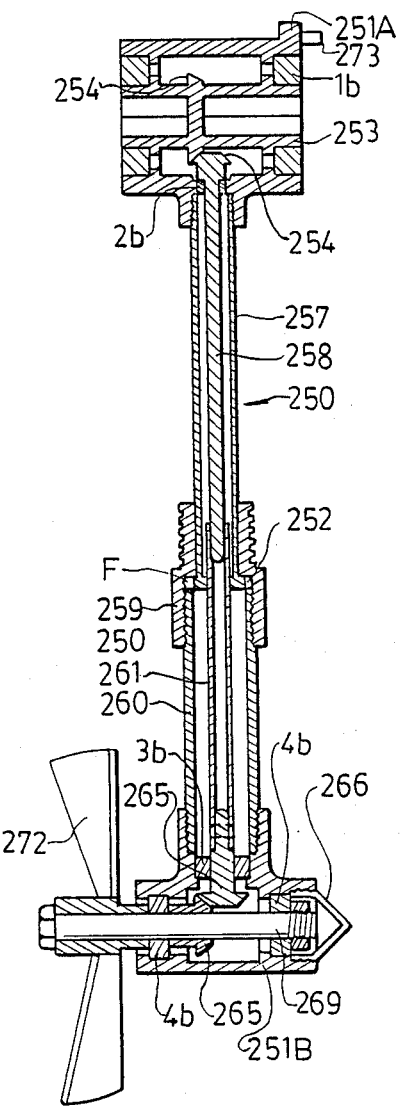
FIG. 52  FIG. 53
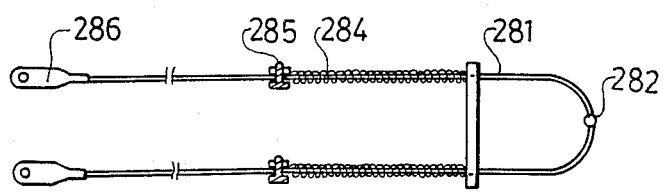
FIG. 55

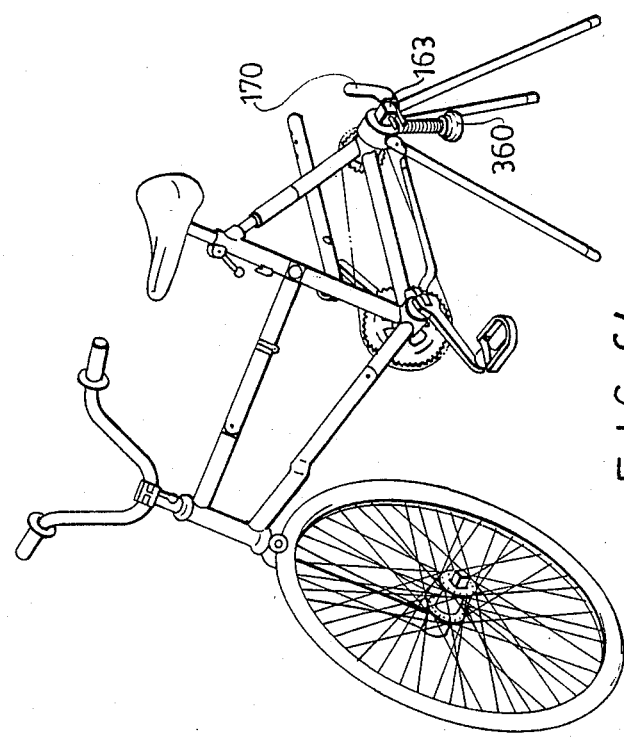
FIG. 64
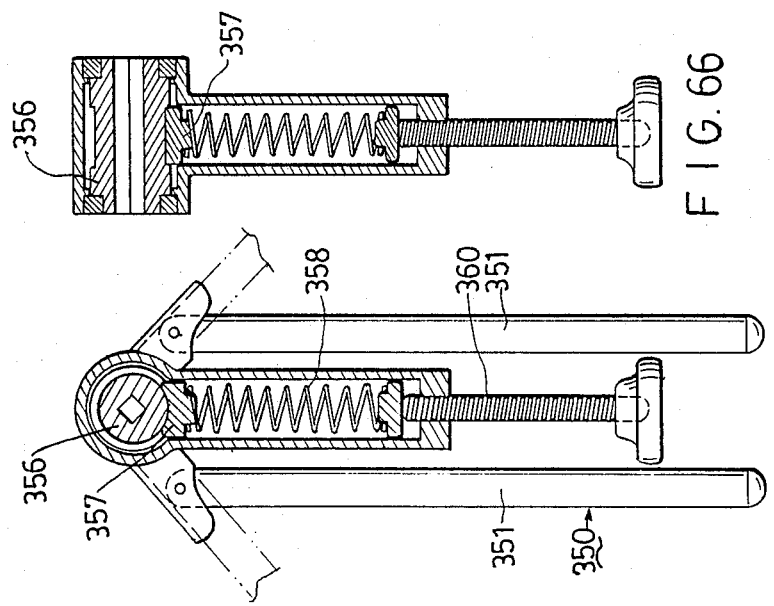
FIG. 66
FIG. 65

FOLDABLE MULTIPURPOSE BICYCLE

BACKGROUND OF THE INVENTION

The present invention relates to new and useful improvements in an amphibious bicycle, and more particularly to one which can be adjusted quickly into the form of a bicycle for riding on land which can be folded quickly into a relatively small portable unit, a hydro-bicycle for riding on smooth surfaced water, and an exercise bicycle for riding in a fixed position.

Conventional amphibious bicycles cannot be folded into a small portable unit due to their complicated structure. In addition, because of the manner in which the frame members are joined, they cannot be folded or unfolded quickly or efficiently by one individual. Furthermore, the chief problem of a conventional foldable amphibious bicycle with a large-size frame and float structure is that it cannot be separated and folded for storage and transport.

SUMMARY OF THE INVENTION

An object of the present invention is to provide an amphibious bicycle which can be folded quickly into a relatively small portable unit.

Another object of the present invention is to provide a foldable amphibious bicycle which can be folded and unfolded quickly, easily, and efficiently by one individual.

Still another object of the present invention is to provide a foldable amphibious bicycle which can be adjusted into the form of an exercise bicycle for riding in a fixed position.

According to the present invention, a foldable multipurpose bicycle includes a foldable main frame, a foldable handlebar assembly, a removable seat assembly, a foldable left pedal assembly, a foldable right pedal assembly, a removable front wheel assembly, a removable rear wheel assembly, a removable wheel connecting rod assembly, a front brake assembly, a foldable rear brake assembly, a removable float assembly, a removable propeller assembly, two removable quick-release lock mechanisms, and a tripod.

The front wheel and the rear wheel according to the present invention are of the same standard size so that they are interchangeable.

After the main frame, handle assembly, seat assembly, left and right pedal assemblies, front and rear brake assemblies are quickly preassembled together, by using the quick-release lock mechanisms, the main frame can be incorporated with the front and rear wheel assemblies to form a bicycle for riding on land. Then, when this bicycle is idle, it can be folded quickly into a relatively small wheel-like portable unit which is convenient and easy to carry, convenient and easy to push along the ground or transport in vehicles, and convenient and easy to store.

In addition, after the preassembly, by using one of the quick-release lock mechanisms, the main frame can be incorporated with the propeller assembly and the float assembly to form a hydro-bicycle for riding on smooth surfaced water.

Also, by using the quick-release lock mechanisms, the main frame can be incorporated with the front wheel assembly and tripod to form an exercise bicycle for riding in a fixed position.

BRIEF DESCRIPTION OF THE DRAWINGS

The present invention shall be further described with reference to the accompanying drawing in which:

FIG. 2 is an elevational right side view showing a main frame of the foldable bicycle;

FIG. 3 is an elevational left side view showing a main frame of the foldable bicycle;

FIG. 4 is a schematic view showing the steering column structure of the foldable bicycle;

FIG. 5 is a perspective view showing an upper diagonal brace of the foldable bicycle;

FIG. 6 is a perspective view showing the upper diagonal brace of the foldable bicycle in a folded position;

FIG. 7 is a schematic side view showing the upper diagonal brace of the foldable bicycle;

FIG. 8 is a schematic bottom view showing the upper diagonal brace of the foldable bicycle;

FIG. 9 is a perspective view showing a lower diagonal brace of the foldable bicycle;

FIG. 12 is a schematic view illustrating the engagement of key and keyway between an upper main tube and a seat supporting rod of the seat assembly;

FIG. 13 is a schematic view illustrating how a seat lock bar interlocks the upper main tube and the seat supporting rod, in which the solid lines show a locking position and the phantom lines show an unlocking position;

FIG. 14 is a schematic view showing a saddle and the seat supporting rod of the foldable bicycle;

FIG. 15 is a schematic view illustrating how the saddle is attached to the foldable bicycle in a folded position;

FIG. 16 is a front view of the foldable bicycle;

FIG. 17 is a perspective view showing a front brake assembly of the foldable bicycle;

FIG. 39 is a schematic perspective view illustrating the attachment of a quick-release lock mechanism between a wheel axle and a wheel hub of the foldable bicycle;

FIG. 40 is a perspective view showing an end portion of the wheel axle;

FIG. 41 is a perspective view showing the quick-release release lock mechanism of the foldable bicycle;

FIG. 41A is an exploded view showing a cam rod of the quick-release lock mechanism;

FIGS. 42 and 43 are schematic views illustrating the operation of the quick-release lock mechanism;

FIGS. 44 to 46 are schematic views illustrating how the integrally mounted parts of the foldable bicycle are folded into a generally triangular small unit;

FIG. 47 is a perspective view showing a wheel connecting rod attached to the saddle of the foldable bicycle;

FIG. 48 is a perspective view showing a clip provided for holding the wheel connecting rod on the saddle;

FIG. 52 is an elevational view showing a propeller assembly of the hydro-bicycle;

FIG. 53 is a schematic side view of the propeller assembly;

FIG. 55 is a top view showing two rudder cables of the hydro-bicycle;

FIG. 64 is a perspective view showing an exercise bicycle which is formed from the foldable bicycle of the present invention by replacing the rear wheel assembly with a tripod;

FIG. 65 is a schematic view showing the tripod of the exercise bicycle wherein the legs of the tripod are floded together; and FIG. 66 is a schematic view illustrating how a friction plate is positioned on a square socket of the tripod.

DETAILED DESCRIPTION OF THE PREFERRED EMBODIMENT

Figure 1:
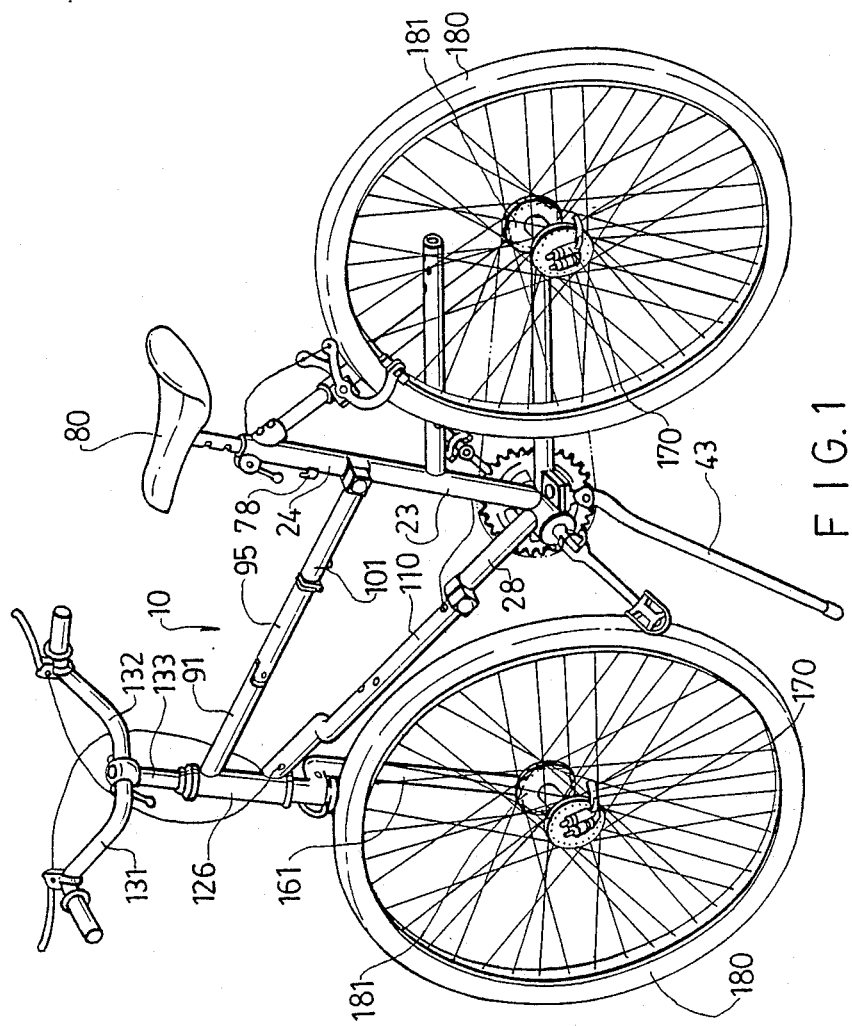
FIG. 1 is a perspective view of a foldable bicycle according to the present invention.

Referring to FIGS. 1 and 2, there is shown a foldable bicycle for riding on land, which is a first form of the present invention. As illustrated, the foldable bicycle is supported by a pair of wheels 180 and a hingedly mounted kickstand 43. This bicycle includes a single front fork 161 and a main frame 10. As shown in FIG. 3, the main frame 10 comprises a front frame portion 90 and a rear frame portion 20. The front frame portion 90 includes a head tube 126, an upper diagonal brace 85 secured to the head tube 126 and hinged to the rear frame portion 20, a lower diagonal brace 110 secured to the head tube 126, and a front inclined tube 28 hinged to the lower diagonal brace 110. The front frame portion 90 looks like a quadrangular truss. A steering column 121 is mounted rotatably in the head tube 126 by ball bearings 122, as shown in FIG. 4.

Referring to FIGS. 3 and 5, the upper diagonal brace 85 includes a front tube 91, a middle tube 95, and a rear tube 101. The middle tube 95 is hinged to the front tube 91 by a first center hinge 93 and to the rear tube 101 by an over-center hinge 98.

With particular reference to FIGS. 6-8, to achieve the over-center hinged joint, the rear end of the middle tube 95 is formed with a first square outward flange 96 and the front end of the rear tube 101 is likewise formed with a second square outward flange 99 which is hinged to the first flange 96 by the over-center hinge 98 at the lower end thereof. Furthermore, to interlock the first flange 96 and the second flange 99, the end surface of the first flange 96 has a tappered bore B and the end surface of the second flange 99 has a bore through which a well-matched taper latch 97 extends. The latch 97 is biased to move toward the tapered bore B by a compression spring 107 which is positioned by a trigger screw 106. When folding the upper diagonal brace 85, the trigger screw 106 is adjusted from the position shown in the solid lines in FIG. 7 to the position shown in the phantom lines in FIG. 7 along a slide slot 108 so that the bias force of the compression spring 107 is released. The middle tube 95 is then rotated relative to the rear tube 101 so that the latch 97 fully disengages from the tapered bore B in the middle tube 95. When it is desired to unfold the folded upper diagonal brace 85, the middle tube 95 is aligned with the rear tube 101. The trigger screw 106 is then returned to the position shown in the solid lines in FIG. 7 so that the latch 97 is biased to insert itself into the bore B, thereby interlocking the middle tube 95 and the rear tube 101.

As illustrated, the rear tube 101 is hinged to the rear frame portion 20 by a bolt 104 and a nut 105.

Referring to FIG. 9, the lower diagonal brace 110 has a bend therein. The front inclined tube 28 is hinged to the lower diagonal brace 110 by a second center hinge 111. Two inclined through holes 109 are provided in the lower diagonal brace 110.

Again referring to FIG. 3, the rear frame portion 20 includes a horizontal member 21, a lower main tube 23, an upper main tube 24, a stay tube 26, a horizontal tube 25, and a rear brake assembly at 50. It looks like a triangular truss. Provided in the horizontal tube 25 are a transverse carry hole 30, a longitudinal carry hole 14, and a pair of inclined through holes 46. The purposes served by these holes will be described subsequently.

Figure 10:
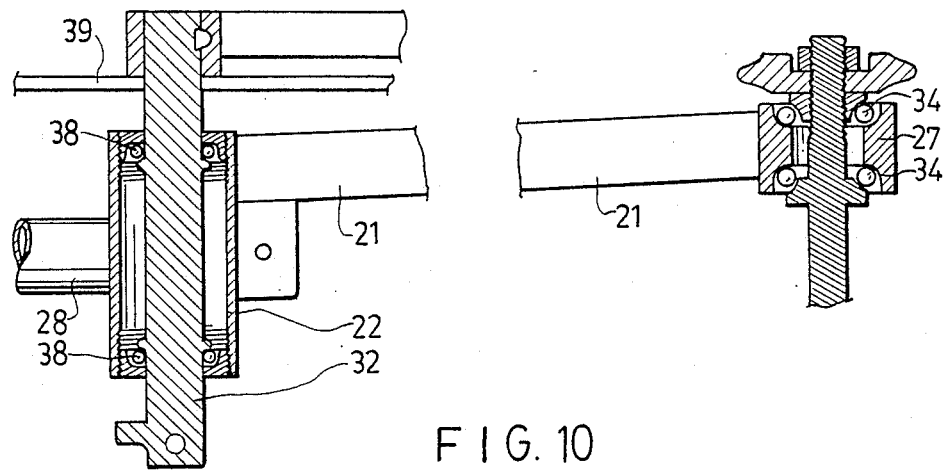
FIG. 10 is a schematic view showing a horizontal member of the foldable bicycle.
Figure 11:
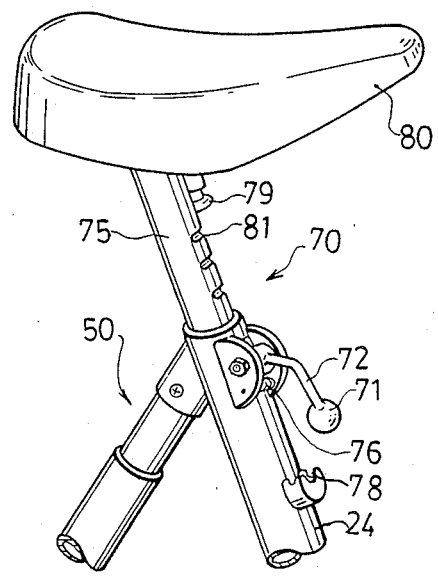
FIG. 11 is a perspective view showing the seat assembly of the foldable bicycle.

Referring to FIG. 10, fixed on the horizontal member 21 are a main hub 22 in which a main sprocket shaft 32 is journalled on ball bearings 38, and a rear hub 27 in which a rear wheel axle 33 is journalled on ball bearings 34. A sprocket wheel 39 is mounted on the main sprocket shaft 32.

Referring to FIGS. 11–14, a seat assembly 70 includes the upper main tube 24, a saddle 80, a seat supporting rod 75 secured to the saddle 80 and movable within the upper main tube 24, and a seat lock bar 72 rotatably mounted on the upper main tube 24 for interlocking the upper main tube 24 and the seat supporting rod 75. Referring to FIG. 12, the seat supporting rod 75 is formed with an elongated keyway S, while the upper main tube 24 is formed with a key K which engages the keyway S for preventing relative rotation between the upper main tube 24 and the seat supporting rod 75.

The seat supporting rod 75 is formed with equally spaced notches 81 disposed at right angles to the main axis of the seat supporting rod 75. The seat lock bar 72 includes an engagement end E which is biased by a torsion spring 76 (see FIG. 11 and 13) to abut against the seat supporting rod 75. The opposite end of the seat lock bar 72 has a knob 72 screwed thereon which is capable of being manually operated to disengage the engagement end E from the seat supporting rod 75, as shown in the phantom lines in FIG. 13. When the engagement end E of the seat lock bar 72 engages any of the notches 81 in the seat supporting rod 75, relative movement of the seat supporting rod 75 in the upper main tube 75 is prevented. Accordingly, the height of the saddle 80 is adjustable. It should be noted that a tongue 79 (see FIG. 11) is secured between the saddle 80 and the seat supporting rod 75, and a groove member 78 (see FIG. 15) is provided on the upper main tube 24 for egageing the tongue 79. Referring to FIG. 15, when the bicycle is folded, the saddle 80 may be removed and temporarily attached to the upper main tube 24 by the engagement of the tongue 79 with the groove member 78.

Figure 18:
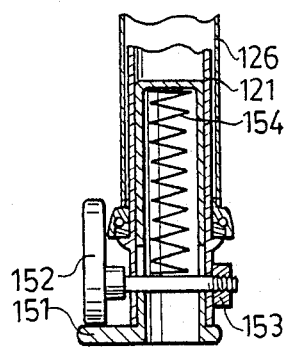
FIGS. 18 and 19 are schematic views illustrating the operation of the front brake assembly.
Figure 19:
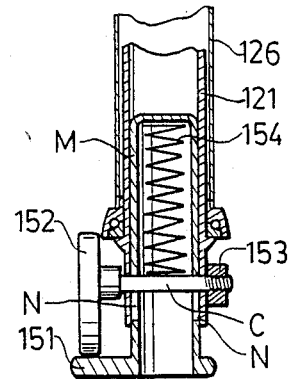

Referring to FIGS. 16–19, a front brake assembly 150 includes a brake pad 151 mounted on the lower end of a slide sleeve M which is mounted movably within the steering column 121. As illustrated, the slide sleeve M is provided with a pair of opposed slide slots N through which a bolt C is passed after a compression spring 154 is inserted into the slide sleeve M above the slide slots N. The bolt C is also passed through the steering column 121 so that the slide sleeve M is biased by the compression spring 154 to move upwardly. A nut 153 engages the bolt C in such a manner that the bolt C can still rotate. Secured to the head of the bolt C is a cam 152 with a bell crank 155 which is connected securely to a front brake cable 158 and which is normally positioned in proximity to the brake pad 151, as shown in FIG. 18. When the front brake cable 158 is pulled upwardly, the cam 152 rotates clockwise to push the brake pad 151 downwardly to press over the front wheel, as shown in FIG. 19. It can be appreciated that this front brake structure is less complex than conventional brake structures.

Figure 20:
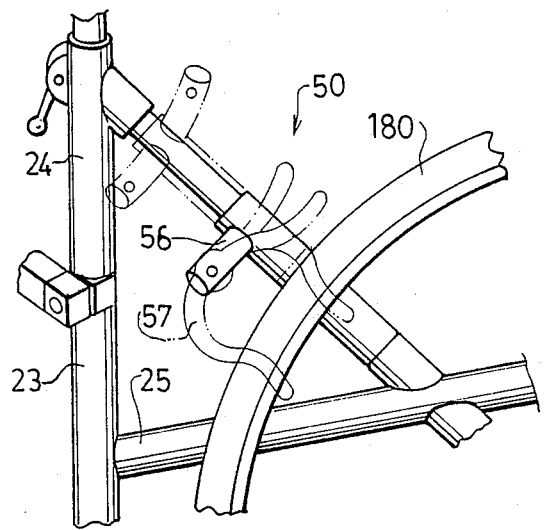
FIG. 20 is a side view showing a rear brake assembly of the foldable bicycle.
Figure 22:
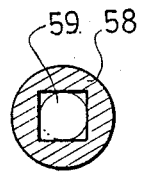
FIG. 22 is a schematic view illustrating the engagement between a square socket of a sliding outer tube and a square adapter of an inner telescoping tube of the rear brake assembly.
Figure 21:
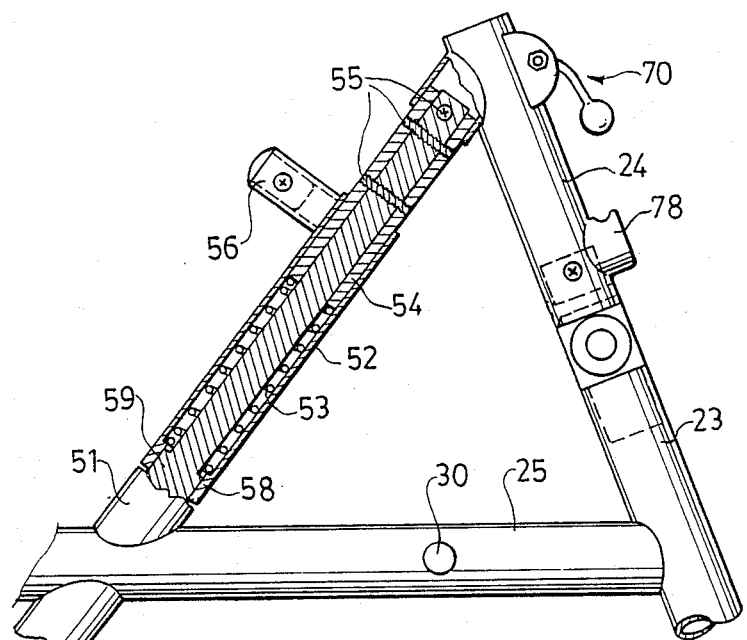
FIG. 21 is a schematic view illustrating how the rear brake assembly is positioned.
Figure 23:
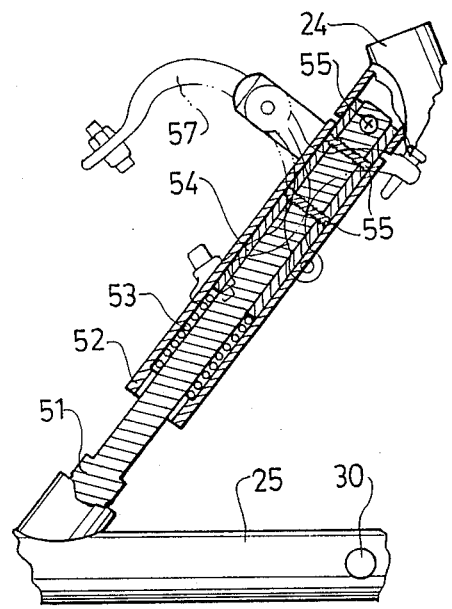
FIG. 23 is a schematic view showing the rear brake assembly in an adjusted position.
Figure 24:
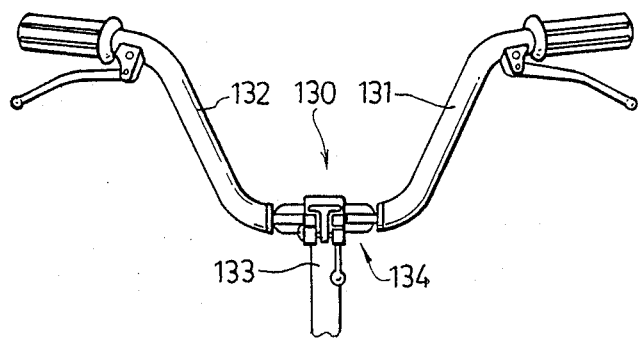
FIG. 24 is a schematic view showing a handlebar assembly of the foldable bicycle.

Referring to FIGS. 20–23, the rear brake assembly 50 includes an inner telescoping tube 51 secured to the horizontal tube 25 which has a square adapter 59 secured to the shoulder thereof. A middle tube 54 is fixed on the inner telescoping tube 51 by three screws 55. A sliding outer tube 52 is slidably mounted on the inner telescoping tube 51 and on the middle tube 54. A compression spring 53 is disposed between the middle tube 54 and the sliding outer tube 52 and biases the sliding outer tube 52 to move downwardly. With particular reference to FIG. 20, a rear brake subassembly 57 is secured to the sliding outer tube 52 by a rear brake fitting 56. Normally, the square adapter 59 of the inner telescoping tube 51 engages the square socket 58 of the sliding outer tube 52, as shown in FIGS. 21 and 22, so that the rear brake sub-assembly 57 is positioned in its operative position, as shown in FIG. 21. When the bicycle is idle, the sliding outer tube 52 may be pushed upwardly to separate the square socket 58 from the square adapter 59 so that the sliding outer tube 52 carrying the rear brake sub-assembly 57 may be rotated to the right side of the main frame 10, i.e. to a folded position. After the sliding outer tube 52 is rotated to its folded position, if the user lets go of the sliding outer tube 52 it is biased by the compression spring 53 to move downwardly and the square socket 58 can again engage the square adapter 59, put in a position rotated 90 degrees from the position in which the brake assembly is shown in FIG. 2. It is apparent that the operation of folding the rear brake assembly 50 is quite simple.

Figure 27:
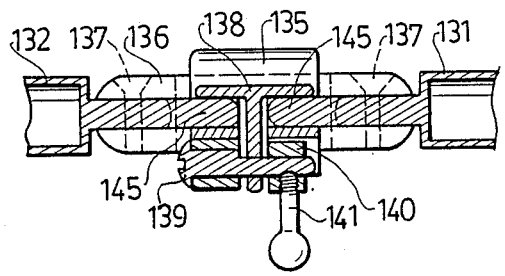
FIG. 27 is a schematic front view of the handlebar assembly.
Figure 29:
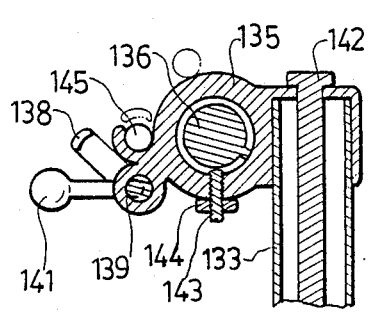
FIG. 29 is a schematic left side view showing the handlebar lock mechanism in an unlocking position.
Figure 28:
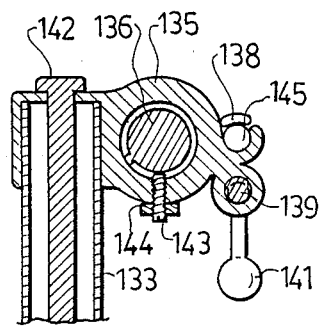
FIG. 28 is a schematic right side view showing a handlebar lock mechanism of the foldable bicycle in a locking position.
Figure 30:
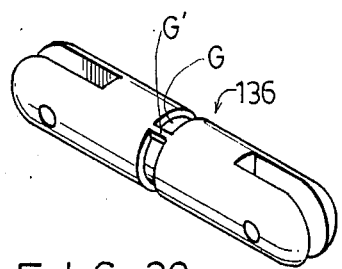
FIG. 30 is a perspective view of the handlebar spindle.

Referring to FIGS. 24–30, a handlebar assembly 130 includes a left handlebar 131, a right handlebar 132, a handlebar fitting 135 mounted on a handle column 133 by an adjustment bolt 142, and a handlebar lock mechanism 134. The left handlebar 131 and right handlebar 132 are articulated by a pair of hinges 137 to the opposite ends of a handlebar spindle 136 which is journalled on the handlebar fitting 135. The handlebar spindle 136 has at the middle thereof an annular guide slot G with a stop G', as shown in FIG. 30. Inserted into the guide slot G' is a guide screw 143 which is fixed on the handlebar fitting 135 by a nut 144, as shown in FIGS. 28 and 29.

The handlebar lock mechanism 134 will be described hereinafter. A pair of guide rods 145 are secured to the handlebars 131 and 132 respectively. The handlebar fitting 135 has at the front thereof a pair of aligned transverse guide slots H for receiving the guide rods 145 therein. When the guide rods 145 are received within the guide slots H, the curved upper cover of a T-shaped hook 138 (see FIGS. 28 and 29) can be moved by hand over the guide rods 145, as shown in the phantom lines in FIG. 29. With particular reference to FIG. 27, the T-shaped hook 138 is connected rotatably to a rotatable cam rod 139 on which a retaining ring 140 and a handlebar lock bar 141 are fixed by the lock bar 141 being threaded through the ring 140 to engage the rod 139. When the handlebar lock bar 141 is turned downwardly, as shown in FIG. 28, the T-shaped hook 138 is moved downwardly and thereby locks the guide rods 145 within their transverse guide slots H. When the guide rods 145 are locked within the transverse guide slots H, the handlebar spindle 136 and the handlebars 131 and 132 cannot rotate, and they are then arranged in the normal operative position.

Figure 25:
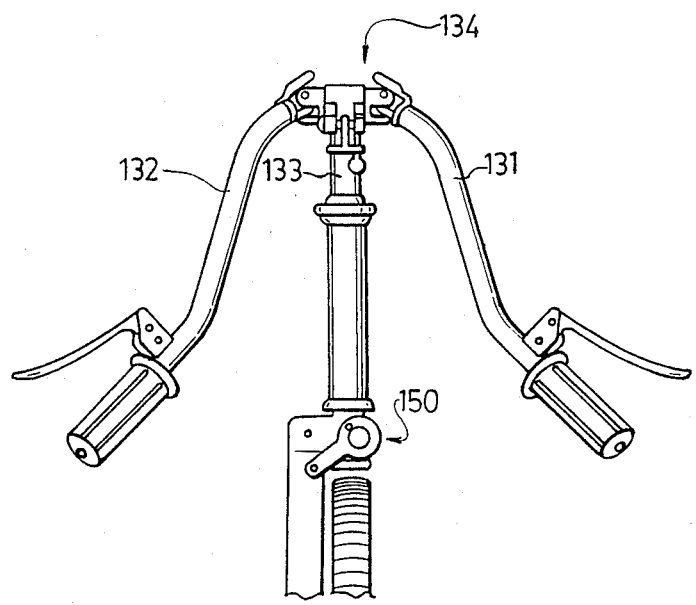
FIG. 25 is a schematic view showing the handlebar assembly in a folded position.
Figure 26:
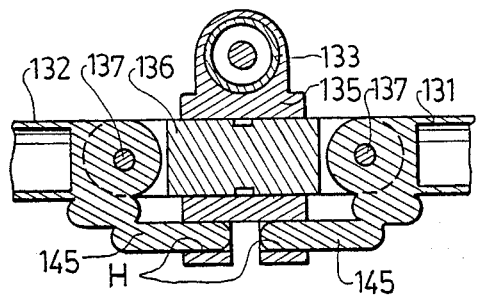
FIG. 26 is a schematic top view illustrating the relationship between two handlebars and a handlebar fitting of the handlebar assembly.

When it is desired to fold the bicycle, the T-shaped hook 138 is moved away from the guide rods 145 by rotating the handlebar lock bar 141. After the guide rods 145 are uncovered, the handlebars 131 and 132 are turned to the front and then folded together, as shown in FIG. 25, in their folded condition. It should be noted that the stop G' of the handlebar spindle 136 constrains the handlebar spindle 136 and hence the handlebars 131 and 132 to rotate within a limited rotational range, which is slightly smaller than 360 degrees. Because the rotational range of the handlebars 131 and 132 is smaller than 360 degrees, the front brake cable 158 attached to the handlebars 131 and 132 cannot become twisted.

Figure 32:
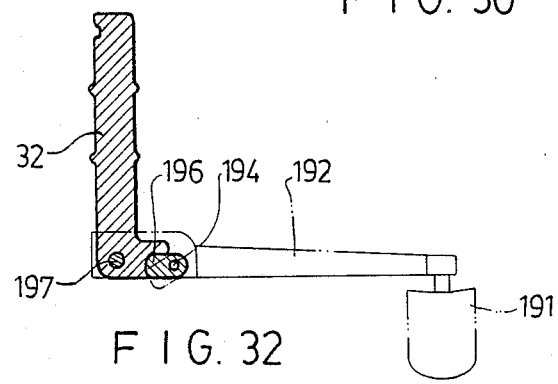
FIG. 32 is a schematic view illustrating the adjustment to the left pedal assembly.
Figure 31:
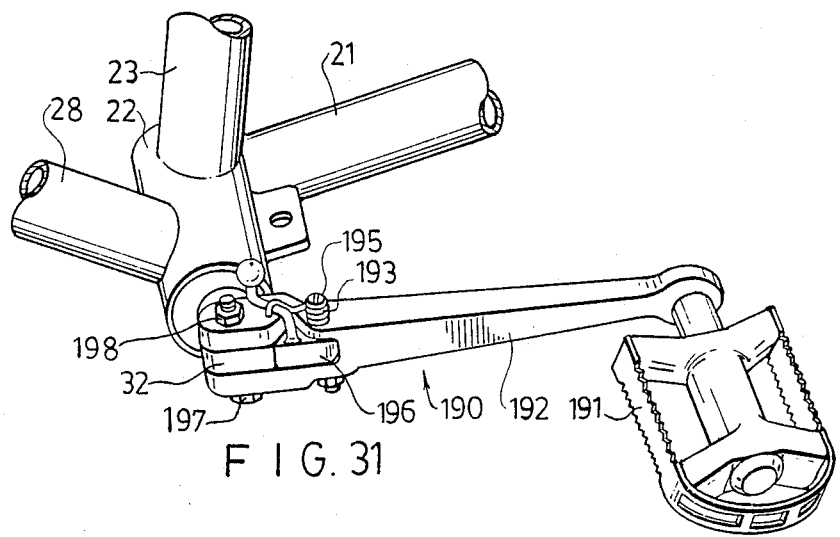
FIG. 31 is a perspective view showing a left pedal assembly of the foldable bicycle.
Figure 33:
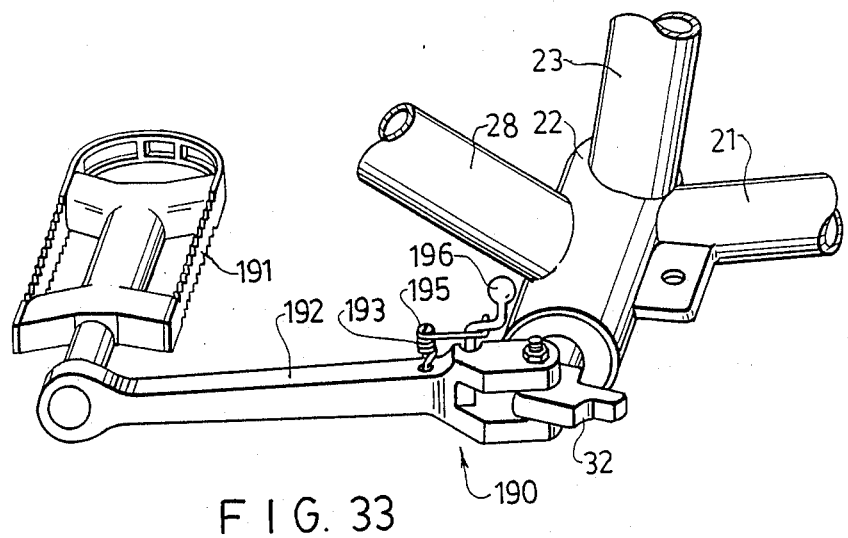
FIG. 33 is a perspective view showing the left pedal assembly of the foldable bicycle in a folded position.
Figure 34:
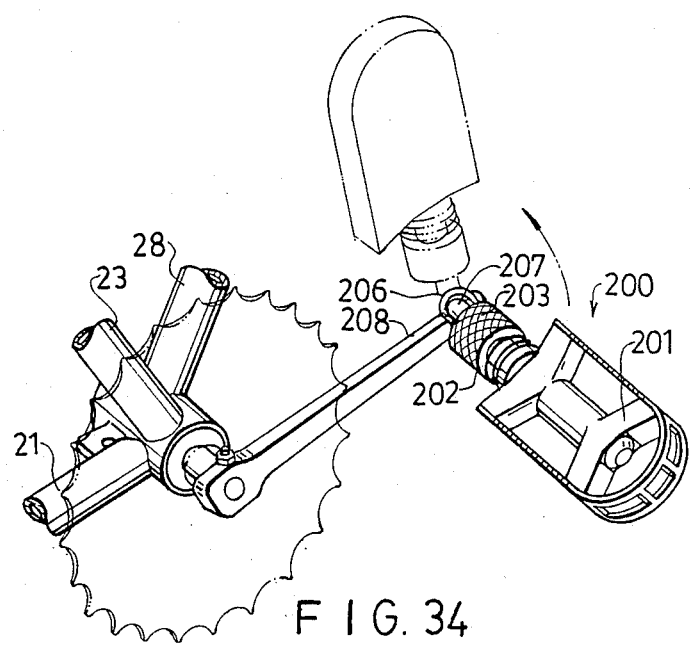
FIG. 34 is a schematic perspective view illustrating how to adjust a right pedal assembly of the foldable bicycle.

Referring to FIGS. 31–33, there is shown the left pedal assembly 190. It includes a left pedal 191 and a left pedal crank 192 connecting the left pedal 191 to the main sprocket shaft 32. The left pedal crank 192 is coupled to the main sprocket shaft 32 by a bolt 197 and a nut 198. A cam latch 196 is arranged to fully occupy the space between the left pedal crank 192 and main sprocket shaft 32 thereby keeping the left pedal crank 192 from rotating relative to the main sprocket shaft 32 in the horizontal plane. The cam latch 196 is hinged to the left pedal crank 192 by a hinge 194. In addition, the cam latch 196 has an arm which is urged by a torsion spring 193 to fully occupy the space between the left pedal crank 192 and the main sprocket shaft 32. The spring 193 is attached to the crank 192 by means of a screw 195.

When it is desired to fold the bicycle, the arm of the cam latch 196 is manually moved against the action of the spring 193 so that the cam latch 196 separates partially from the space between the left pedal crank 192 and the main sprocket shaft 32, as shown in the phantom lines in FIG. 32. The left pedal crank 192 is then rotated 180 degrees to the position shown in FIG. 33. When use of the folded left pedal assembly 190 is desired, the left pedal crank 192 is rotated back to the position shown in FIG. 31. The cam latch 196 will be urged back to its operative position by the action of the torsion spring 193.

Figure 38:
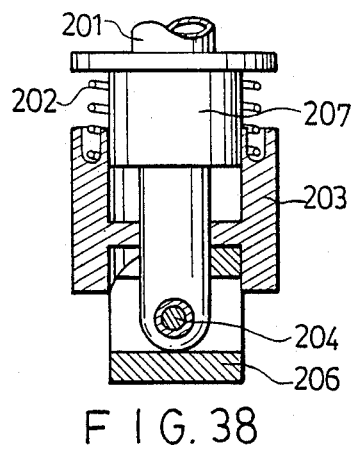
FIG. 38 is a schematic side view illustrating the adjustment to the right pedal assembly.
Figure 37:
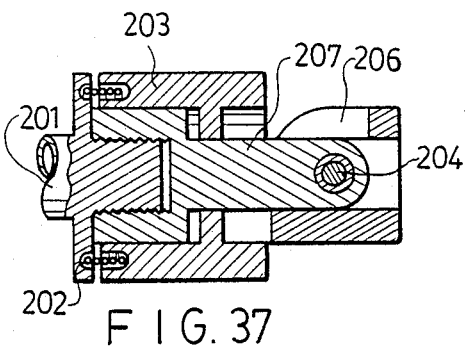
FIG. 37 is a schematic view illustrating the relationship between the extension rod and the pedal fitting of the right pedal assembly in an actuated position.
Figure 36:
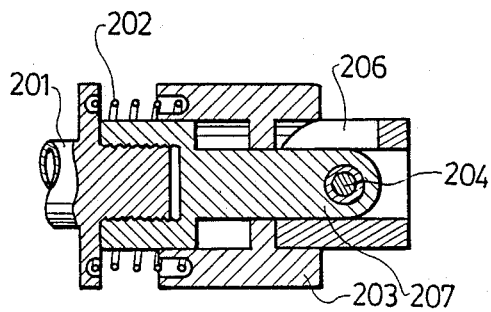
FIG. 36 is a schematic view illustrating the relationship between an extension rod and a pedal fitting of the right pedal assembly in an operative position.
Figure 35:
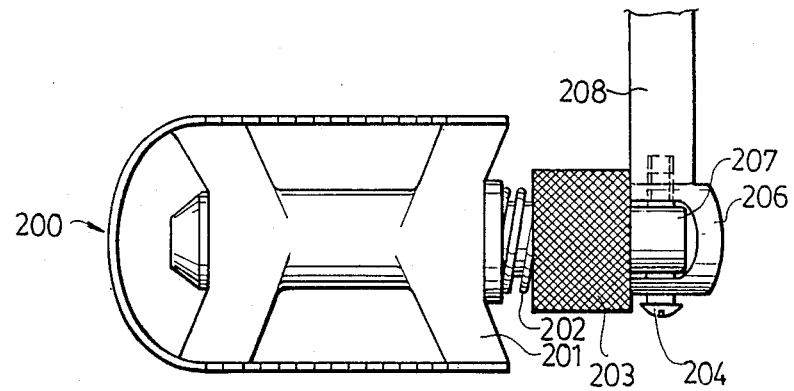
FIG. 35 is a perspective view of the right pedal 10 assembly.

Referring to FIGS. 34–38, there is shown the right pedal assembly 200. It includes a right pedal 201 provided with a transverse extension rod 207. A right pedal crank 208 is provided with a pedal fitting 206 which has an open-ended transverse slot. The end of the transverse extension rod 207 is received in the transverse slot in the pedal fitting 206 and hinged at its distal end to the right pedal crank 208 by a hinge bolt 204. The pedal fitting 206 has a rounded upper edge facing the right pedal 201, as shown in FIGS. 36–38. Sleeved on the transverse extension rod 207 are a sliding sleeve 203, which has an inwardly directed flange, and a compression spring 202 which biases the sliding sleeve 203 to engage and lock on the pedal fitting 206, as shown in FIGS. 35 to 37, thereby preventing rotation of the extension rod 207 relative to the pedal fitting 206 in use.

When it is desired to fold the right pedal assembly 200, the sliding sleeve 203 is moved manually away from the pedal fitting 206 so that the compression spring 202 is compressed, as shown in FIG. 37. The transverse extension rod 207 is then rotated through 90 degrees about hinge 204 to a vertical position, as shown in the phantom lines in FIG. 34. When the transverse extension rod 207 arrives at the vertical position, the sliding sleeve is released and it is biased by the compression spring 202 to again engage the pedal fitting 206, now holding the pedal 191 in a folded position. It is understood that the rounded upper edge of the pedal fitting 206 makes the rotation of the transverse extension rod 207 very easy.

Referring to FIGS. 39–43, there is shown a quick-release hub lock mechanism 170. It includes a cam rod 177 inserted into a through hole 167 (see FIG. 40) in an externally threaded wheel axle 163. The axle 163 has a square portion which passes through a square passage through the wheel hub 181. A lock nut 166 is provided to lock the axle 163 on the main frame 10. The cam rod 177 includes a cam roller 173 which is secured at a splined portion 177' of the cam rod 177 by a lock screw 174 (see FIGS. 41A, 42 and 43). A curved lock bar 171 is secured to the tail end of the cam rod 177. A torsion spring 175 is provided for biasing a latch bar 172 fixed on a rotatable latch rod 178 to move away from the lock bar 171. With reference to FIG. 41A, to prevent relative rotation between the cam roller 173 and the cam rod 177, the splined portion 177' of the cam rod 177 is externally splined, while the cam roller 173 is internally splined.

In operation, to insert the cam rod 177 into the through hole 167 in the wheel axle 163, the latch bar 172 and the lock bar 171 must be first nipped to abut against each other so that the cam rod 177 can be inserted into the through hole 167. When the cam rod 177 is inserted into the through hole 167, it is remote from the end surface of the wheel hub 181 and the cam roller 173 is spaced from the end surface of the wheel hub 181. The lock bar 171 is then rotated in proximity with the end surface of the wheel hub 181. The user will let go of the quick-release hub lock mechanism 170 so that an insert 179 secured to the latch rod 178 can be biased by the torsion spring 175 to engage a cavity 168 in the wheel axle 163, thereby locking the guick-release hub lock mechanism 170 on the wheel axle 163. At this time, both the cam roller 173 and the latch rod 178 will abut against the end surface of the wheel hub 181, as shown in FIG. 42.

When it is desired to remove the wheel axle 163 from the wheel hub 181, the latch bar 172 is pressed against the lock bar 171 so that the insert 179 can disengage from the cavity 168. The lock bar 171 is then rotated about the cam rod 177 to the position shown in FIG. 43 so that the hub lock mechanism 170 can be removed from the wheel axle 163.

Figure 44:
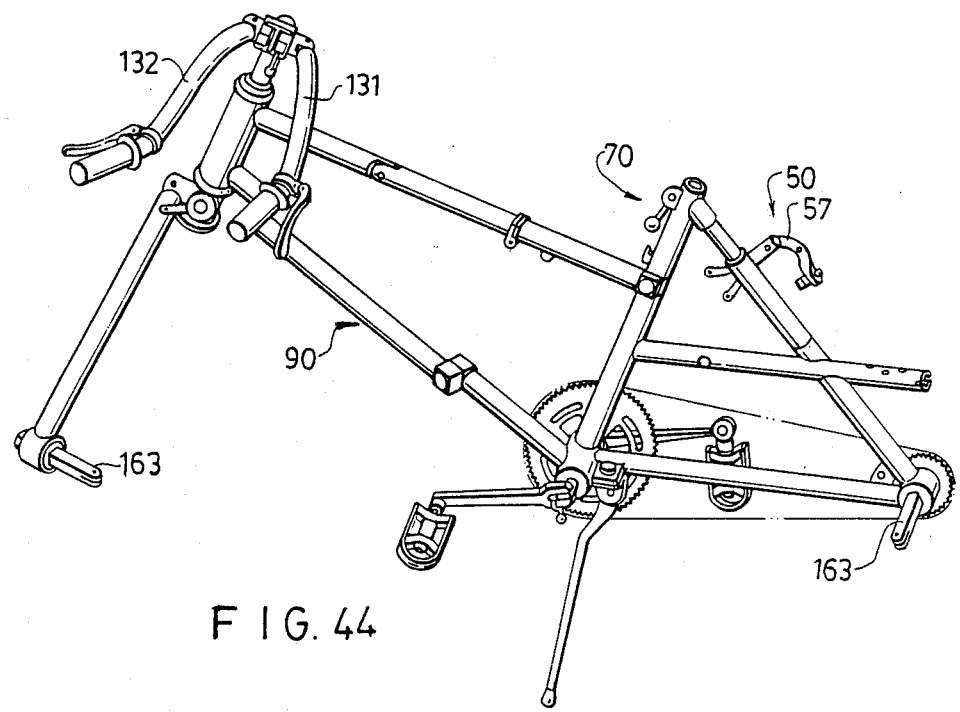

In folding the bicycle, referring to FIG. 44, the saddle 80 carrying the seat supporting rod 75 is first removed from the upper main tube 24 by actuating the seat lock bar 72. The sliding outer tube 52 of the rear brake assembly 50 carrying the rear brake subassembly 57 is then pulled upwardly and rotated through 90 degrees to the right. And, the left handlebar 131 and the right handlebar 132 are rotated to the front and folded to form a side-by-side arrangement by first actuating the handlebar lock bar 141. The right pedal assembly 200 is then folded. After the right pedal assembly 200 has been completely folded, by laying the bicycle down on its right side and releasing the quick-release hub lock mechanisms 170, the front and rear wheels 180 can be removed from the front and rear wheel axles 163. The handlebar assembly 130 is then rotated through 90 degrees so that the left handlebar 131 abuts against the front frame portion 90.

Figure 45:
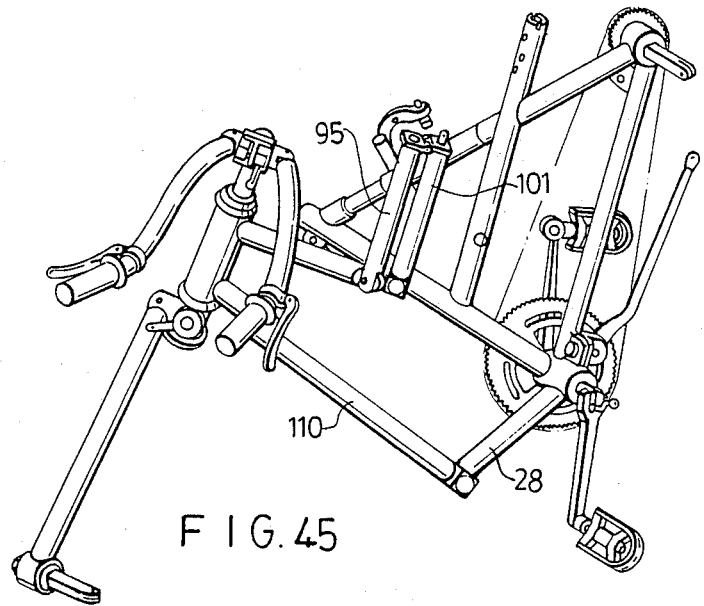

Secondly, referring to FIG. 45, the trigger screw 106 is loosened and moved to its rearmost position. The over-center hinge 98 is then pulled upwardly permitting the middle tube 95 and the rear tube 101 of the upper diagonal brace 85 to be paralleled with each other. The lower diagonal brace 110 thus takes a V-shape.

Finally, referring to FIG. 46, the left pedal assembly 190 and the kickstand 43 are folded in turn. The front frame portion 90 is again adjusted to overlap on the rear frame portion 20. A generally triangular small unit is thus formed from the integrally mounted parts of the foldable bicycle.

Figure 49:
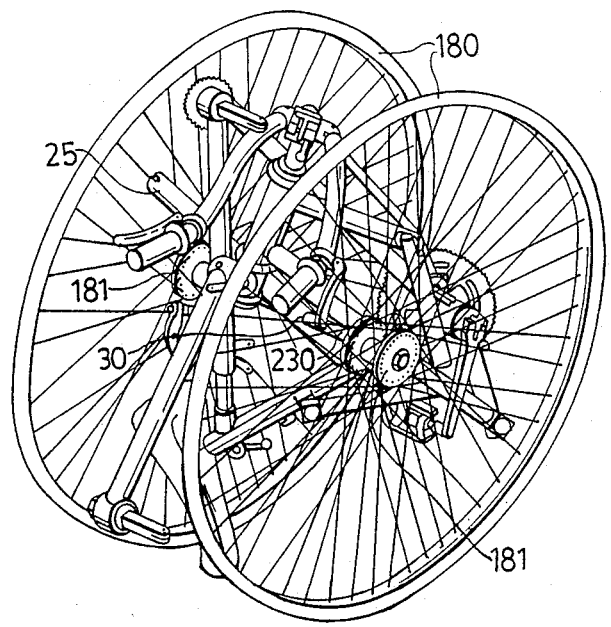
FIG. 49 is a perspective view showing the foldable bicycle which has been folded into a wheel-like unit.
Figure 50:
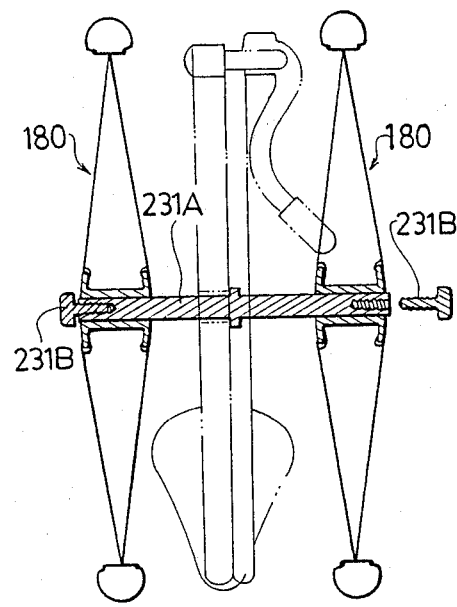
FIG. 50 is an elevational view of the wheel-like unit.

Referring to FIG. 47, a wheel connecting rod 230 is held within the saddle 80 by a pair of spring clips 232 (see FIG. 48). The wheel connecting rod 230 includes a rod body 231A and a pair of end bolts 231B secured to the opposite ends thereof. Referring to FIGS. 49 and 50, at final stage of folding the bicycle, the rod body 231A is inserted through the transverse carry hole 30 in the horizontal tube 25. Then, the wheels 180 are sleeved on the opposite ends of the wheel connecting rod 230. The end bolts 231B are screwed to the rod body 231A so that the generally triangular unit is positioned between the wheels 180. Finally, the removed saddle 80 with the seat supporting rod 75 is attached to the upper main tube 24 by inserting the tongue 79 into the groove member 78. It can be seen from FIGS. 49 and 50 that the generally triangular unit is fully within the wheels 180 and looks like a wheel. It is apparent that the wheel-like unit can be conveniently pushed on the ground.

Certainly, it is understood that a flexible bag may be provided for receiving the wheel-like portable unit therein.

Figure 51:
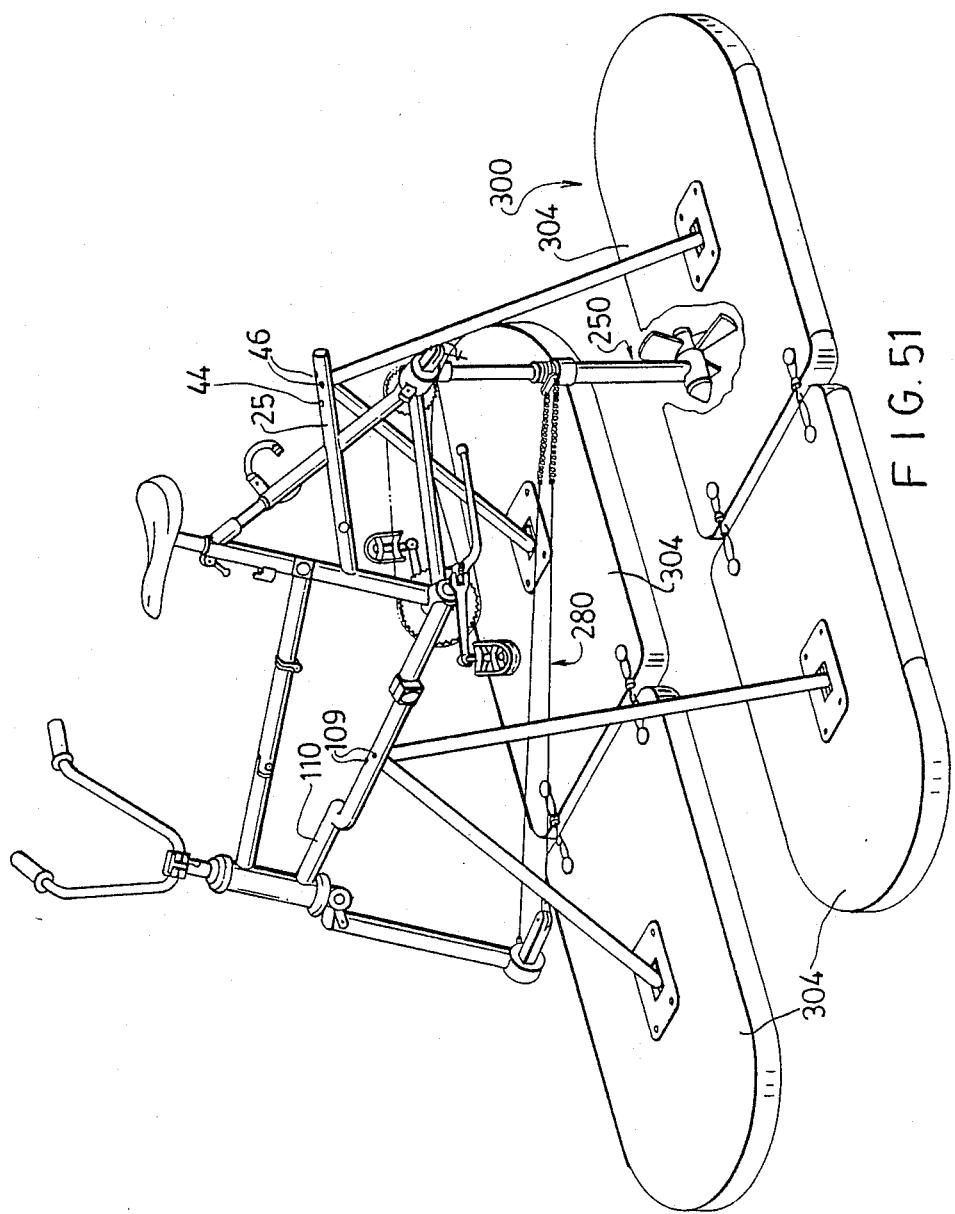
FIG. 51 is a persepetive view showing a hydro-bicycle which is formed from the foldable bicycle of the present invention.

Referring to FIG. 51, there is shown a hydro-bicycle which is a second form of the present invention. The hydro-bicycle is formed by replacing the wheels 180 of the bicycle with a propeller assembly 250, a rudder cable assembly 280, and a float assembly 300.

The propeller assembly 250, as shown in FIGS. 52 and 53, has a pipe structure which includes an upper horizontal pipe 251A, a lower horizontal pipe 251B, and an extendable vertical pipe consisting of an inner pipe 257 and a slide outer pipe 260. The inner pipe 257 is formed with an outward flange F. The outer pipe 260 is formed with a stop shoulder 252 for preventing the removal of the inner pipe 257 therefrom.

The propeller blades 272 are driven by a transmission which includes a square wheel axle socket 253 mounted rotatably within the upper horizontal pipe 251A and which is arranged to be sleeved on the rear wheel axle 33. A square inner drive shaft 258 is mounted rotatably within the inner pipe 257 and connected to the socket 253 by a pair of interconnecting first bevel gears 254. A square outer telescoping drive shaft 261 is mounted rotatably within the outer pipe 260 and sleeved slidably on the inner drive shaft 258. A propeller rotating shaft 269 is mounted rotatably in the lower horizontal pipe 251B and is connected to the outer telescoping drive shaft 261 by two interconnecting second bevel gears 265. In FIG. 53, bearings 1b, 2b, 3b, and 4b are respectively provided in the upper horizontal pipe 251A, inner pipe 257, outer pipe 260, and lower horizontal pipe 251B.

Again referring to FIG. 3, the rear frame portion 20 has a guide hole 31 which is adjacent to the rear hub 27. The upper horizontal pipe 251A is provided with a guide pin 273. When the propeller assembly 250 is mounted on the rear wheel axle 163 by the quick-release lock mechanism 170, a guide pin 273 is inserted into the guide hole 31 to prevent the propeller assembly 250 from rotating relative to the main frame 10. The outer pipe 260 will move downwardly to its lowermost position by the force of gravity. As illustrated, a threaded cap 266 is screwed to the lower horizontal pipe 251B. When the left pedal 191 and the right pedal 201 are rotated, the rear wheel axle 163 will drive the rotating shaft 269 through the wheel axle socket 253, inner drive shaft 258, and outer drive shaft 261 and hence cause the propeller blades 271 to rotate, thereby propelling the hydro-bicycle.

Figure 54:
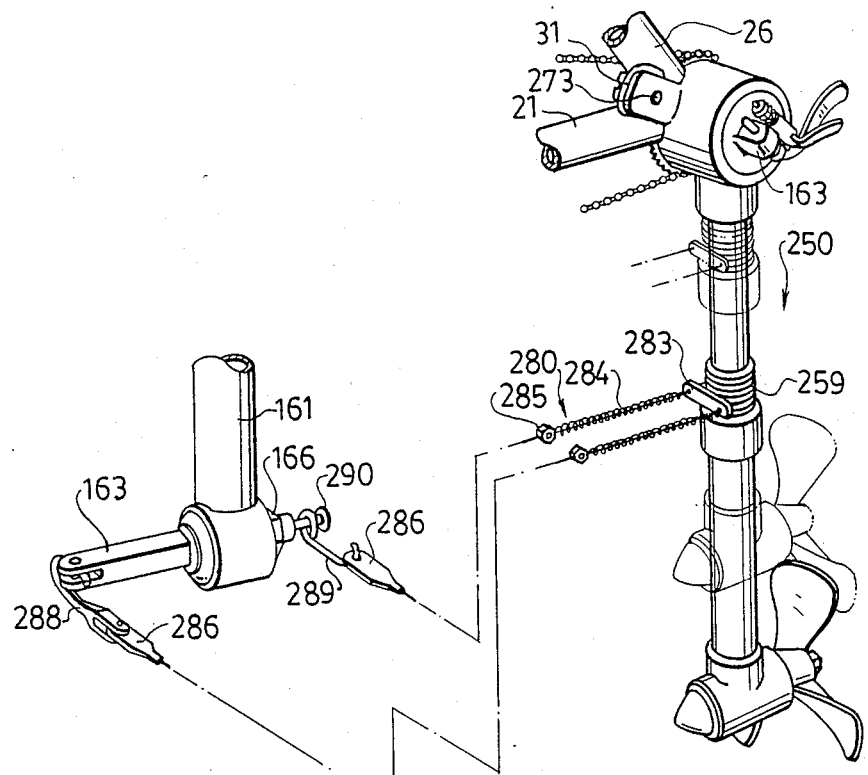
FIG. 54 is a perspective view showing a rudder cable assembly of the hydro-bicycle.
Figure 57:
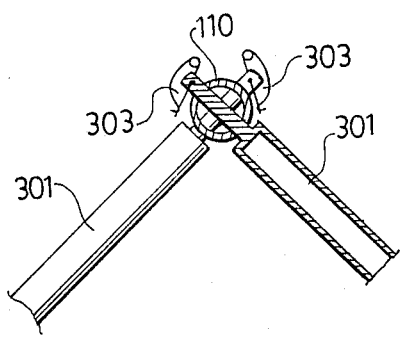
FIG. 57 is a schematic view illustrating the connection between the lower diagonal brace and two float connecting rods of the hydro-bicycle.
Figure 56:
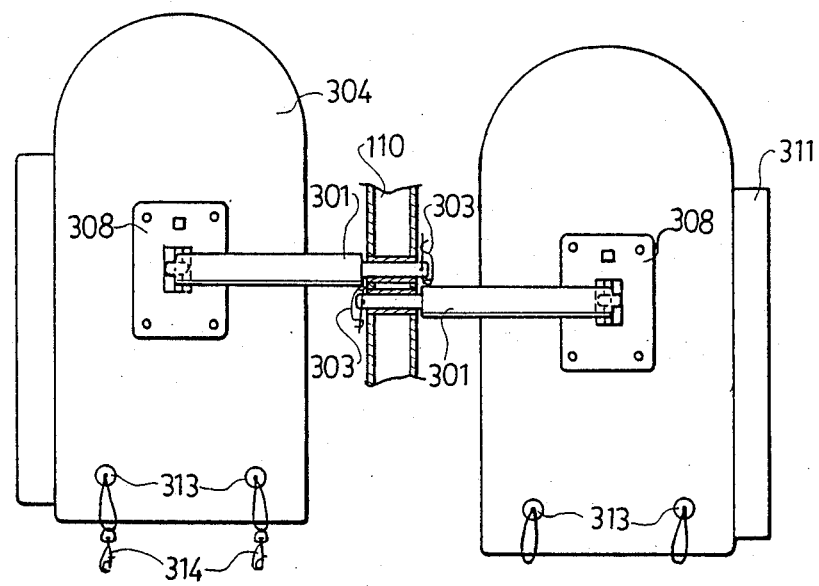
FIG. 56 is a schematic top view illustrating the connection between a lower diagonal brace and two floating bodies of the hydro-bicycle.
Figure 58:
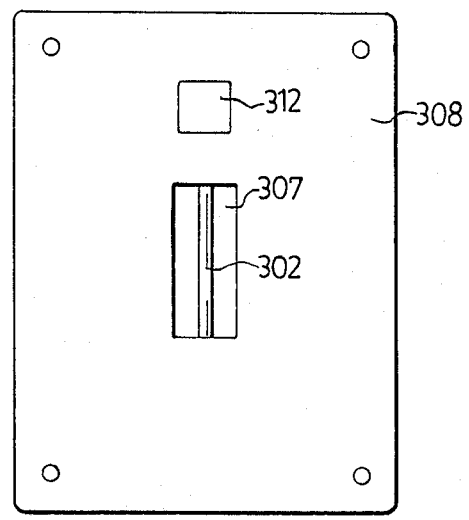
FIG. 58 is a top view of a plate mounted on the floating body.

A rudder cable assembly 280, as shown in FIGS. 54 and 55, includes a pair or rudder cables 281. The leading ends of the rudder cables 281 are attached to the opposite sides of the single front fork 161 by means of hooks 288, 289 and looped straps 286. Additionally, the tail ends of the rudder cables 281 are connected with each other. As illustrated, installed on each of the rudder cables 281 is a compression spring 284 which has an adjustment bolt 285 and a push rod 283 biased to move away from the adjustment bolt 285. The push rod 283 and the rudder cables 281 define together a closed portion for being sleeved on a cable drum 259 attached to the upper end of the outer pipe 260. The closed portion is provided with a stop ball 282 which is used to engage with a stop hole 274 (see FIG. 52) formed in the cable drum 259. Due to the bias force of the push rod 283 and to the engagement of the stop ball 282 and the stop hole 274, the rudder cables 281 disposed partially around the cable drum 259 can be maintained a parallel condition.

On one side of the single front fork 161 is the front wheel axle 163 which has a hole for attachment with the hook 288. The other side of single front fork 161 includes the lock nut 166 and a cap screw 290 which is fastened by the hook 289. When the handlebars 131 and 132 are swung so that the steering column 121 and hence the single front fork 161 rotate, the rudder cables 281 follow and move alternatively to and fro. When the rudder cables 281 move to and fro, the outer pipe 260 and the lower horizontal pipe 251B will rotate, thereby rotating the rotating shaft 269 to adjust the advancing direction of the hydro-bicycle.

Referring to FIGS. 51–60, a float assembly 300 includes four floating bodies 304 each having an air chamber 302 and connected to the main frame 10 by a float connecting rod 301 which has a diameter-reduced upper end for engaging with the inclined through hole 46, 109 in the main frame 10. Each of the rods 301 has a through hole in the diameter-reduced upper end thereof. After the diameter-reduced upper end of each float connecting rod 301 is inserted into the corresponding inclined through hole 46, 109 in the main frame 10, a safety pin 303 is inserted through the through hole in the rod 301 for locking the float connecting rod 301 on the main frame 10. Fixed on the upper surfaces of each floating body 304 is a plate 308 having a slot 307 in which a horizontal cylindrical rod 302 is fixed. The lower end of each rod 301 is provided with a U-shaped hook 306 (see FIGS. 59A and 59B) which has a gap for the insertion of the cylindrical rod 302 therethrough.

Figure 59A:
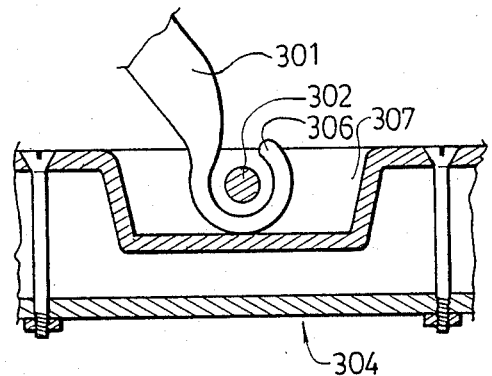
FIGS. 59A and 59B are schematic longitudinal sectional views illustrating the relative movement between the floating body and the float connecting rod.
Figure 59B:
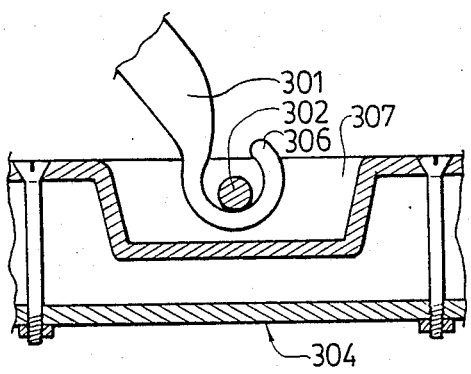
Figure 59C:
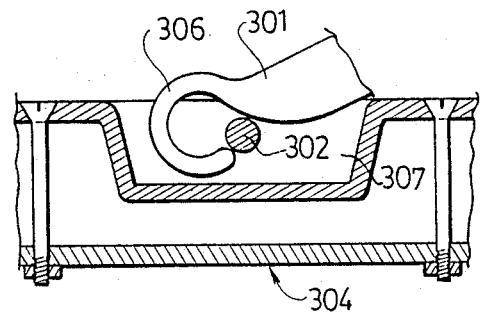
FIG. 59C is a schematic longitudinal sectional views illustrating the method of engaging the floating body with the float connecting rod.

In assembly, the U-shaped hook 306 of the float connecting rod 301 is moved to catch the cylindrical rod 302 in the manner shown in FIG. 59C. Then, the floating connecting rod 301 is rotated about the cylindrical rod 302 to the position shown in either FIG. 59A or FIG. 59B. The diameter-reduced upper end of the float connecting rod 301 is then inserted into the inclined through hole 46, 109 and subsequently positioned on the main frame 10 by means of the safety pin 303. In use, the U-shaped hook 306 of the connecting rod 302 will move relative to the cylindrical rod 302 between its lowermost position shown in FIG. 59A and its uppermost position shown in FIG. 59B. Thus, the U-shaped hook 306 cannot move away from the cylindrical rod 302 when the hydro-bicycle moves on smooth surfaced water.

Figure 60:
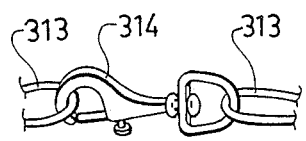
FIG. 60 is a perspective view showing interconnected straps and spring-acting ring hook which are provided for interconnecting the adjacent floating bodies.
Figure 61:
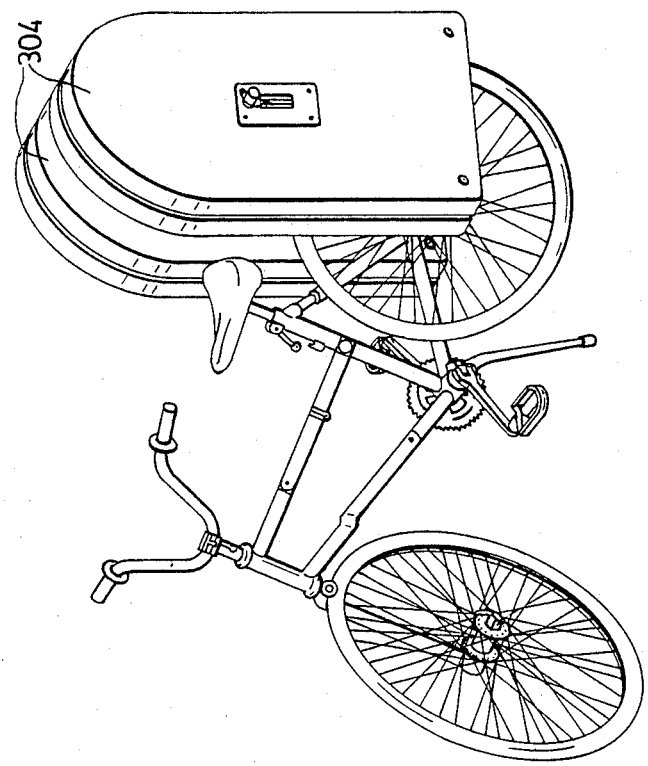
FIG. 61 is a perspective view showing the foldable bicycle on which the propeller assembly, the floating bodies, the float connecting rods, and the rudder cable assembly are being carried.

The two right floating bodies 304 may be connected by straps 313 and spring-acting ring hooks 314, as shown in FIG. 60. Similarly, the two left floating bodies 304 may be connected in the same manner. In addition to the slot 307, the plate 308 is also provided with a rectangular through hole 312 which is useful only when the floating bodies 304 are carried on the bicycle, as shown in FIG. 61. On a side of the floating body 304, an elongated storage bag 311 is provided for storage of a float connecting rod 301 when the float assembly 300 is carried on the bicycle.

Figure 62:
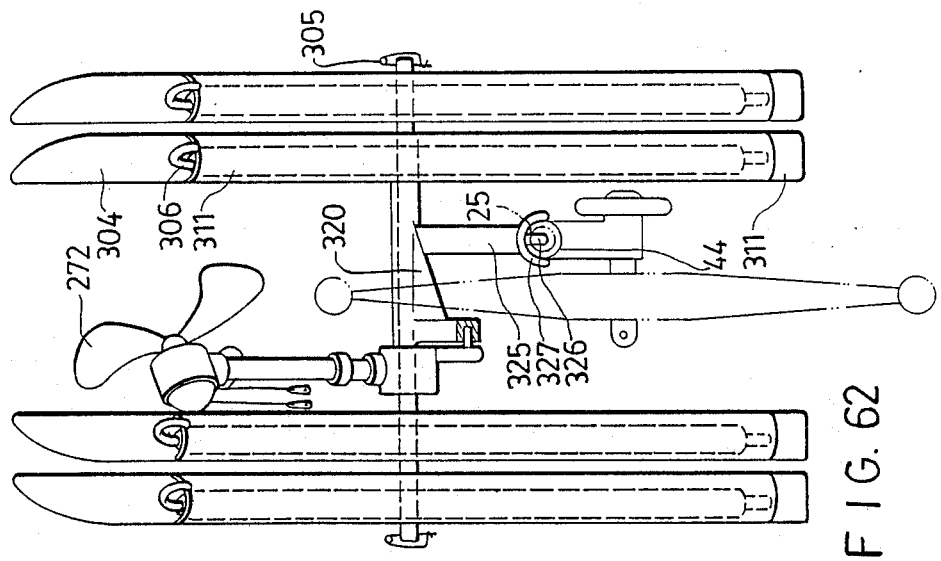
FIG. 62 is a schematic plan view illustrating possible connection between the adjacent two of the propeller assembly, the floating bodies, the float connecting rods, the rudder cable assembly, and a horizontal tube of the main frame.
Figure 63:
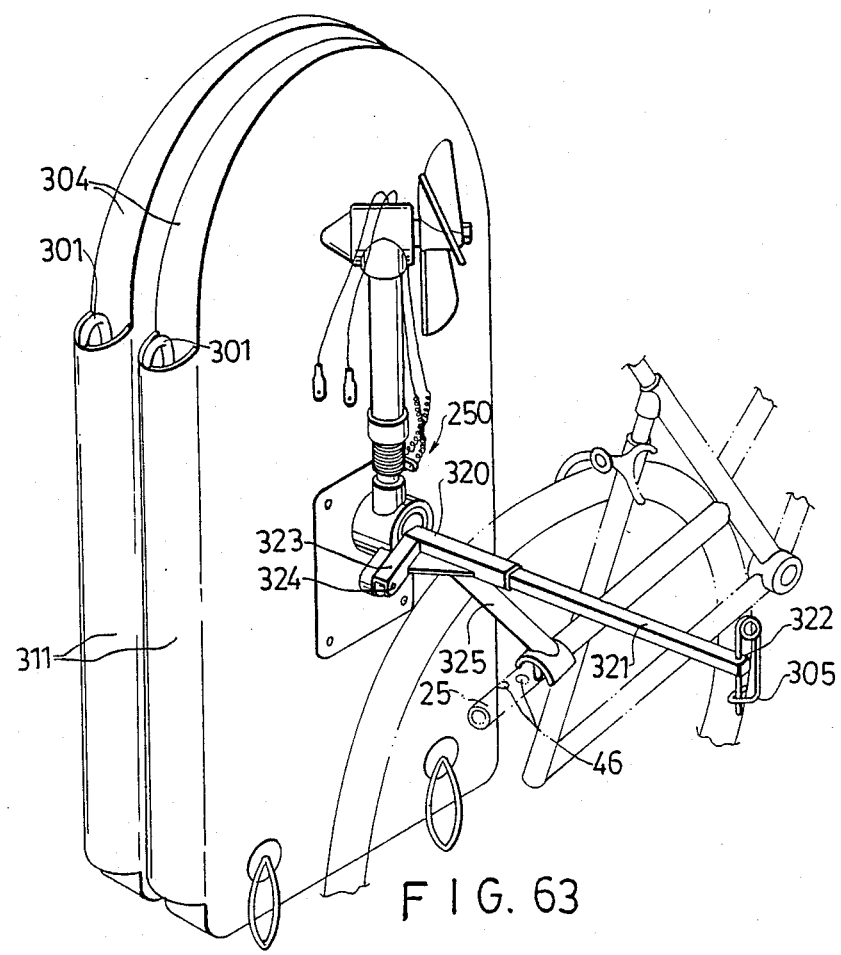
FIG. 63 is a schematic perspective view showing the possible connection between the adjacent two of the propeller assembly, the floating bodies, the float connecting rods, the rudder cable assembly, and the horizontal tube.

Referring to FIGS. 61–63, there is shown means for attaching the propeller assembly 250, the rudder cable assembly 280 and the float assembly 300 to the horizontal tube 25. The attaching means includes a square connecting rod 321 which has a through hole 322 provided in each end thereof. Sleeved rigidly on the middle portion of the connecting rod 321 is a bushing 320 which includes a guide rod 323 extending therefrom at an angle and having a guide hole 324, and an insertion rod 325 extending downwardly. The lower end of the insertion rod 325 is provided with a downward projection 326 and a C-shaped bracket 327.

The downward projection 326 of the insertion rod 324 is used to be inserted into the longitudinal carry hole 44 in the horizontal tube 25 (see FIG. 3). The C-shaped bracket 327 is shaped to conform to the curvature of the horizontal tube 25 so that the insertion rod 325 and the floating body connecting rod 321 are positioned stably on the horizontal tube 25.

In operation, referring to FIG. 62, after the insertion rod 325 is attached to the horizontal tube 25, the propeller assembly 250 carrying the rudder cable assembly 280 is sleeved on the connecting rod 321 and abuts against the left end of the bushing 320 while permitting the guide pin 273 of the propeller assembly 250 to be inserted into the guide hole 324 in the guide rod 323. Then, on each end portion of the connecting rod 321, a pair of floating bodies 304 are sleeved. After the floating bodies 304 have been positioned on the connecting rod 321, a pair of safety pins 305 are respectively inserted through the through holes 322 in the connecting rod 321. Finally, each float connecting rod 301 is inserted into a storage bag 311.

Thus, it is practical that the propeller assembly 250, the rudder cable assembly 280, and the float assembly 300 are taken by the bicycle to a shore. Then, the wheels 180 are replaced with the propeller assembly 250, the rudder cable assembly 280, and the float assembly 300 to form the hydro-bicycle for riding on smooth surfaced water near the shore.

Referring to FIGS. 64–66, there is shown an exercise bicycle which is a third form of the present invention. Instead of the rear wheel 180, a tripod 350 is connected removably to the rear wheel axle 163. The tripod 350 has three foldable legs 351 which are mounted in a known manner. A square socket 356 (see FIG. 65) is mounted rotatably on the upper end of the tripod 350 for connecting securely with the rear wheel axle 163 by the quick-release lock mechanism 170. To provide the exercise effect, a friction device is installed on the tripod 350. The friction device includes a friction plate 357 biased to extend into an annular guide slot (see FIG. 66) in the square socket 356 by a compression spring 358 which is positioned by an adjustment bolt 360.

As explained in the foregoing, according to the present invention, the assembly for supporting the main frame 10 is capable of being changed to form a bicycle for riding on land, a hydro-bicycle for riding on smooth surfaced water, or an exercise bicycle for riding insides. In addition to such multifunctional effect, it is advantageous in that the bicycle can be folded into a compact wheel-like unit for convenient transportation or storage.

With the present invention thus explained, it is apparent that various modifications and variations can be made without departing from the scope and spirit of the present invention. It is therefore intended that the present invention be limited only as indicated in the appended claims.

I claim:

1. A foldable multipurpose bicycle comprising:
a foldable main frame;
a handlebar assembly mounted foldably on said main frame;
a seat assembly having a saddle mounted removably on said main frame;
a left pedal assembly mounted foldably on said main frame;
a right pedal assembly mounted foldably on said main frame;
a front wheel assembly having a front wheel of a standard diameter mounted removably on said main frame;
a rear wheel assembly having a rear wheel of said standard diameter mounted removably on said main frame;
a front brake assembly mounted on a front portion of said bicycle;
a rear brake assembly mounted foldably on a rear portion of said bicycle;
a float assembly mounted removably on said main frame;
a propeller assembly mounted removably on said main frame, said propeller assembly being comprised of:
a pipe structure including a vertical pipe, an upper horizontal pipe secured to and communicating with an upper end of said vertical pipe, and a lower horizontal pipe secured to and communicating with a lower end of said vertical pipe;

a propeller having a horizontal rotating shaft journalled on an end of said lower horizontal pipe, and a plurality of propeller blades fixed on said rotating shaft;

a drive shaft extending through said vertical pipe of said pipe structure;

a wheel axle socket mounted rotatably within said upper horizontal pipe and adapted to be sleeved rigidly on a wheel axle;

a first pair of interconnecting bevel gears respectively fixed on said drive shaft and said wheel axle socket for transferring rotation therebetween;

a second pair of interconnecting bevel gears respectively fixed on said drive shaft and said rotating shaft of said propeller for transferring rotation therebetween; and a pair of generally parallel rudder cables adapted to be fixed separately on a steering column at an end thereof and fixed separately on said vertical pipe of said pipe structure at the other end thereof, said rudder cables being interdisposed with sufficient tension between said steering column and said vertical pipe of said pipe structure to enable said upper and lower horizontal pipes to rotate about said vertical pipe by rotating said handlebar assembly;

whereby, said handlebar assembly can drive said lower horizontal pipe of said pipe structure and hence said rotating shaft of said propeller to rotate about said vertical pipe of said pipe structure while said left and right pedal assemblies can drive said propeller blades of said propeller to rotate;

two quick-release lock mechanisms for locking releasably said front wheel and said rear wheel respectively on said main frame; and a wheel connecting rod assembly mounted removably on said bicycle for attaching said front and rear wheels rotatably to center of said main frame when said bicycle is folded;

whereby, when said float assembly and propeller assembly are removed from said main frame, the remaining parts of said bicycle form a bicycle for riding on land; when said front and rear wheels are removed from said main frame, the remaining parts of said bicycle can be adjusted to form a hydro-bicycle for riding on smooth surfaced water, so that said propeller assembly propels said hydro-bicycle by rotating said left and right pedal assemblies and varies the advancing direction of said hydro-bicycle by rotating said handlebar assembly; when said bicycle is idle, said float assembly and propeller assembly may be removed from said main frame and the remaining parts of said bicycle are collapsible to form a wheel-like small unit.

2. A bicycle as claimed in claim 1, further comprising a supporting frame means which can replace said rear wheel to support said main frame thereby causing said bicycle to form an exercise bicycle.

3. A bicycle as claimed in claim 2, wherein said support frame means has a friction device mounted thereon for producing a frictional resistance to rotation of a wheel axle driven by said left and right pedal assemblies, thereby providing exercise effect.

4. A bicycle as claimed in claim 3, wherein said friction device comprises:

a square rear wheel axle connected rotatably to said main frame;

a square socket sleeved rigidly on said rear wheel axle;

a friction plate positioned near said square socket;

a compression spring having an end biasing said friction plate to press over said square socket; and an adjustment bolt drivable to move the other end of said compression spring along longitudinal axis of said compression spring to adjust magnitude of pressure of said compression spring against said square socket.

5. A bicycle as claimed in claim 2, wherein said support frame is a tripod.

6. A bicycle as claimed in claim 4, wherein said tripod is locked on said main frame by one of said quick-release lock mechanisms.

7. A bicycle as claimed in claim 1, wherein said propeller assembly is locked releasably on said main frame by one of said quick-release lock mechanisms when said bicycle is adjusted into said hydro-bicycle.

8. A bicycle as claimed in claim 1, wherein said main frame comprises:

a front frame portion including:

an upper diagonal brace including a front tube, a first center hinge, a middle tube connected hingedly to said front tube by said first center hinge, an over-center hinge, a rear tube connected hingedly to said middle tube by said over-center hinge, and an lock mechanism for interlocking releasably said middle and rear tubes, a lower diagonal brace including a front tube, a second center hinge, and a rear tube connected hingedly to said front tube of said lower diagonal brace by said second center hinge, and a head tube secured to a leading end of said upper diagonal brace and to a leading end of said lower diagonal brace; and a rear frame portion, connected hingedly to a tail end of said upper diagonal brace, secured to a tail end of said lower diagonal brace, having a transverse carry hole provided therein and allowing for insertion of said wheel connecting rod assembly therethrough.

9. A bicycle as claimed in claim 8, wherein said lock mechanism includes a first outward flange formed at a tail end of said front tube of said upper diagonal brace, and a second outward flange formed at a leading end of said rear tube of said upper diagonal brace and aligned with said first flange, and an over-center hinge interconnecting lower ends of said first and second flanges, one of an end surface of said second flange and an end surface of said first flange having a tapered bore therein, the other of said end surface of said second flange and said end surface of said first flange having a spring-biased taper latch inserted into said tapered bore; whereby, when said lock mechanism is released to fold said bicycle, said taper latch is adjusted to disengage from said tapered bore so that said middle tube can be rotated relative to said rear tube.

10. A bicycle as claimed in claim 1, wherein said wheel connecting rod assembly includes a connecting rod and two end bolts screwed to both ends of said connecting rod.

11. A bicycle as claimed in claim 1, wherein said wheel connecting rod assembly is held within said saddle when it is idle.

12. A bicycle as claimed in claim 9, wherein said seat assembly comprises:

an upright upper main tube fixed on said main frame and having a key extending lenthwise on an inner surface thereof;

a supporting rod, secured to a bottom of said saddle, movable within said upper main tube, including an elongated keyway engaged with said key for preventing relative rotation between said seat supporting rod and said upper main tube, and a plurality of equally spaced notches formed lengthwise in said seat supporting rod;

a seat lock bar, mounted rotatably on said upper main tube, having an engagement end selectively engaged with one of said notches, and a release end drivable to disengage said engagement end from said seat supporting rod; and a torsion spring for biasing said engagement end of said seat lock bar to move toward said seat supporting rod so that said engagement end engages with one of said notches in said supporting rod to prevent relative movement between said supporting rod and said upper main tube;

whereby, height of said saddle can be easily adjusted by engagement of said engagement end of said seat lock bar with selected one of said notches in said seat supporting rod.

13. A bicycle as claimed in claim 1, wherein said handlebar assembly comprises:

an upright steering column;

a handlebar fitting fixed on an upper end of said steering column;

a handlebar spindle journalled on said handlebar fitting;

a pair of handlebars hinged to two opposite ends of said handlebar spindle;

a handlebar lock mechanism for locking releasably said handlebar spindle and said handlebars on said handlebar fitting;

whereby, when said bicycle is folded, said handlebar lock mechanism is released so that said handlebars can be turned fowardly and folded together.

14. A bicycle as claimed in claim 12, wherein said handlebar lock mechanism comprises:

a pair of guide rods secured to said handlebars respectively;

a transverse guide slot formed horizontally in a front portion of said handlebar fitting and open at both ends of said transverse guide slot for receiving said guide rods therein; and a T-shaped hook closing removably an opening in said transverse guide slot to press over said guide rods so as to retain said guide rods in said transverse guide slot;

whereby, when said T-shaped hook is removed from said guide rods, said guide rods can be removed from said transverse guide slot so that said handlebars can be rotated to fold together.

15. A bicycle as claimed in claim 1, wherein said front brake assembly comprises:

a front brake pad disposed slidably above said front wheel and biased to move upwardly;

a front brake cable; and a cam normally spaced from said front brake pad and rotatable by said front brake cable to push said front brake pad to press against said front wheel.

16. A bicycle as claimed in claim 1, wherein said rear brake assembly comprises:

an inner telescoping tube secured to said main frame and having a square adapter fixed thereon;

a sliding outer tube, sleeved slidably on said inner telescoping tube, having a square socket secured to said sliding outer tube and sleeve on said square adapter of said inner telescoping tube;

a rear brake sub-assembly secured to said sliding outer tube; and means for biasing said square socket of said sliding outer tube to engage with said square adapter of said inner telescoping tube;

whereby, when said rear brake assembly is folded, said square socket of said sliding outer tube is disengaged from said square adapter of said inner telescoping tube so that said sliding outer tube can be rotated to a predetermined position.

17. A bicycle as in claim 1, wherein said left pedal assembly comprises:

a left pedal;

a left pedal crank connected rotatably to said left pedal and adapted to be connected rotatably to a main sprocket wheel; and a latch cam, interlocking said left pedl crank and said main sprocket wheel, rotatable to enable said left pedal crank to rotate through 180 degrees relative to said main sprocket wheel in a horizontal plane when said bicycle is folded.

18. A bicycle as claimed in claim 1, wherein said right pedal assembly comprises:

a right pedal crank adapte to be connected securely to a main sprocket wheel;

a pedal fitting, secured to said right pedal crank, including a rounded upper edge at an outer end thereof and a transverse slot provided horizontally in said pedal fitting, said transverse slot being open at an outer end thereof;

a right pedal;

a transverse extension rod, having a first end connected securely to said right pedal, and a second end opposite to said first end, said second end being received within said transverse slot and hinged to said pedal fitting so that said transverse rod can rotate through 90 degrees to a vertical position; and a compression spring sleeved movably on said transverse extension rod;

a sleeve, disposed slidably on said transverse extension rod, having an inwardly directed flange at an intermediate portion thereof, biased by said compression spring to sleeve tightly on said pedal fitting;

whereby, when said sleeve is manually operated to move away from said pedal fitting, said transverse extension rod carrying said right pedal can rotate through 90 degrees from an operative position to a folded position, and vice versa, and then allow said sleeve to be biased by said compression spring to sleeve on said pedal fitting.

19. A bicycle as claimed in claim 1, wherein each of said front and rear wheel assemblies includes a hub having two generally flat end surfaces, and a wheel axle inserted through said hub and having an end portion in which a through hole and a specially shaped cavity are formed, and wherein each of said quick-release lock mechanism comprises:

a cam rod inserted through said through hole in said wheel axle;

a cam roller fixed on said cam rod and contacting said corresponding end surface of said hub using its greatest radius area; and an insert, biased to engage with said cavity in said cam roller to lock said cam quick-release lock mechanism on said wheel axle.

20. A bicycle as claimed in claim 1, wherein said float assembly comprises:
   a pair of aligned left float connecting rods each connected removably to left of said main frame at an upper end thereof;
   a pair of aligned left floating bodies each connected removably to a lower end of said corresponding left float connecting rod;
   a pair of aligned right float connecting rods each connected removably to right of said main frame at an upper end thereof;
   a pair of aligned right floating bodies each connected removably to a lower end of said corresponding right float connecting rod.

21. A bicycle as claimed in claim 1, wherein each of said floating bodies has a rigid flat upper surfaces including a slot formed in said upper surface and a cylindrical rod fixed on said upper surface in said slot, wherein each of said float connecting rods has a U-shaped hook secured to a lower end thereof and having an opening at an upper end of said U-shaped hook for retaining said cylindrical rod in said U-shaped hook.

22. A bicycle as claimed in claim 1, further comprising means for attaching removably said float assembly and said propeller assembly together to a rear portion of said main frame, said attaching means comprises:
   a horizontal tube fixed on said main frame and having a carry hole provided longitudinally therein; and
   an attachment frame, connected removably to said float assembly and to said propeller assembly, including an insertion tube longitudinally downwardly extending therefrom for being inserted removably into said longitudinal carry hole in said horizontal tube, and a C-shaped bracket fixed on said insertion tube for abutting closely said horizontal tube when said insertion tube is inserted into said longitudinal carry hole.

23. A bicycle as claimed in claim 1, wherein saddle includes a tongue secured thereto, and wherein said main frame includes a groove provided therein capable of receiving tightly said tongue therein, so that said saddle can be fixed on said main frame by engagement of said tongue with said groove when said bicycle is folded.

* * * * *